June 9, 1964   L. M. GAGEANT   3,136,268
AUTOMATIC PIE MACHINE
Filed Oct. 30, 1961   19 Sheets-Sheet 1
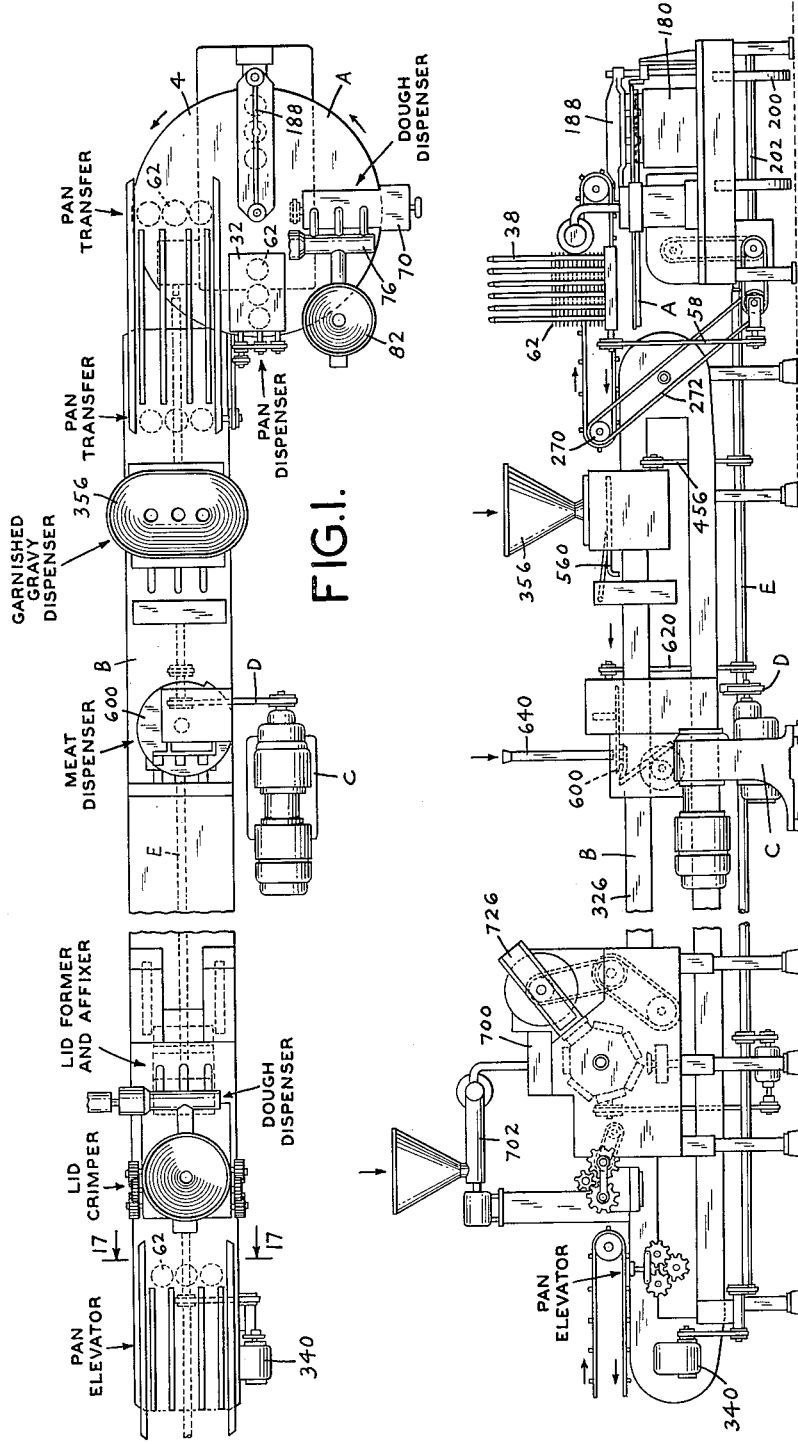

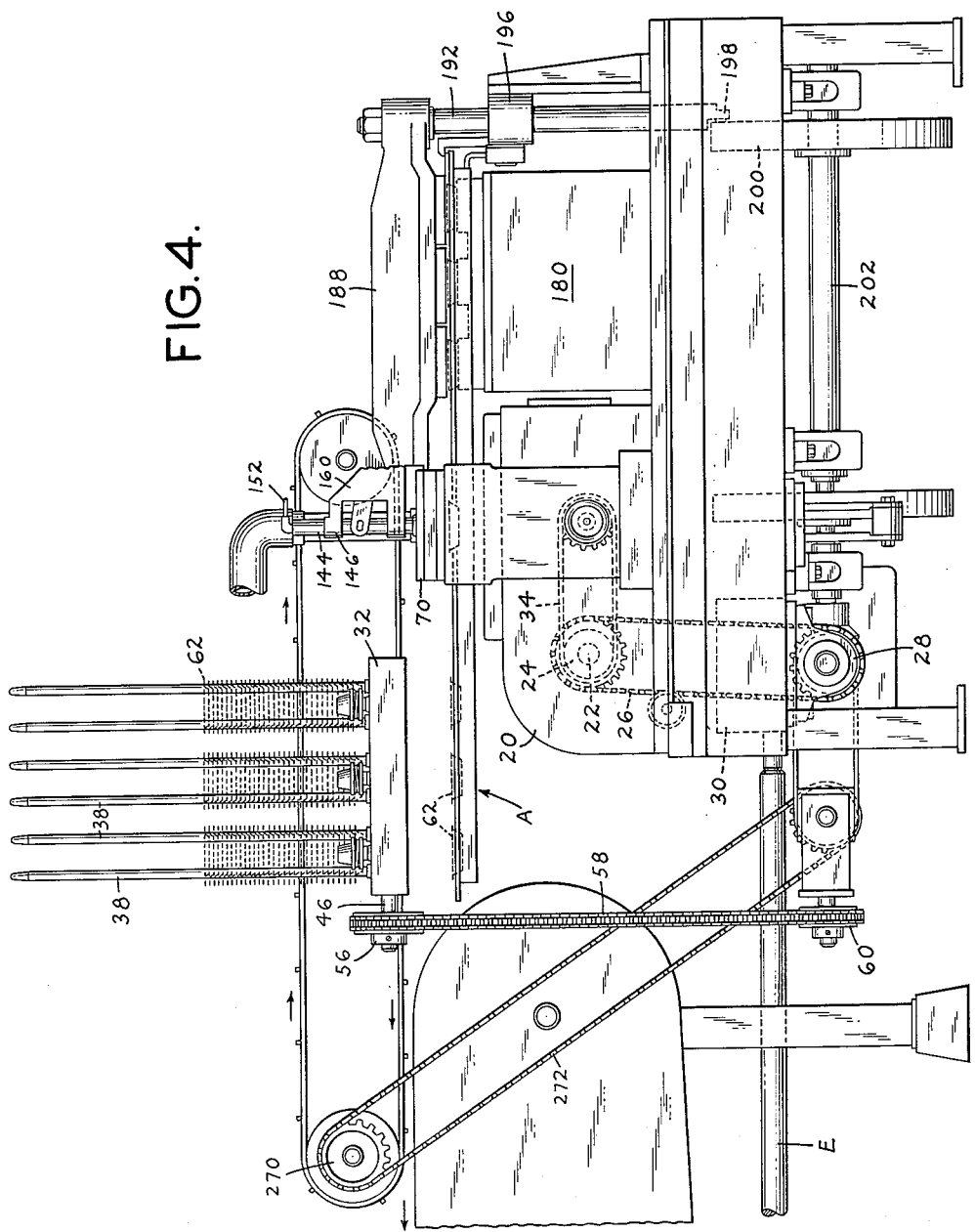

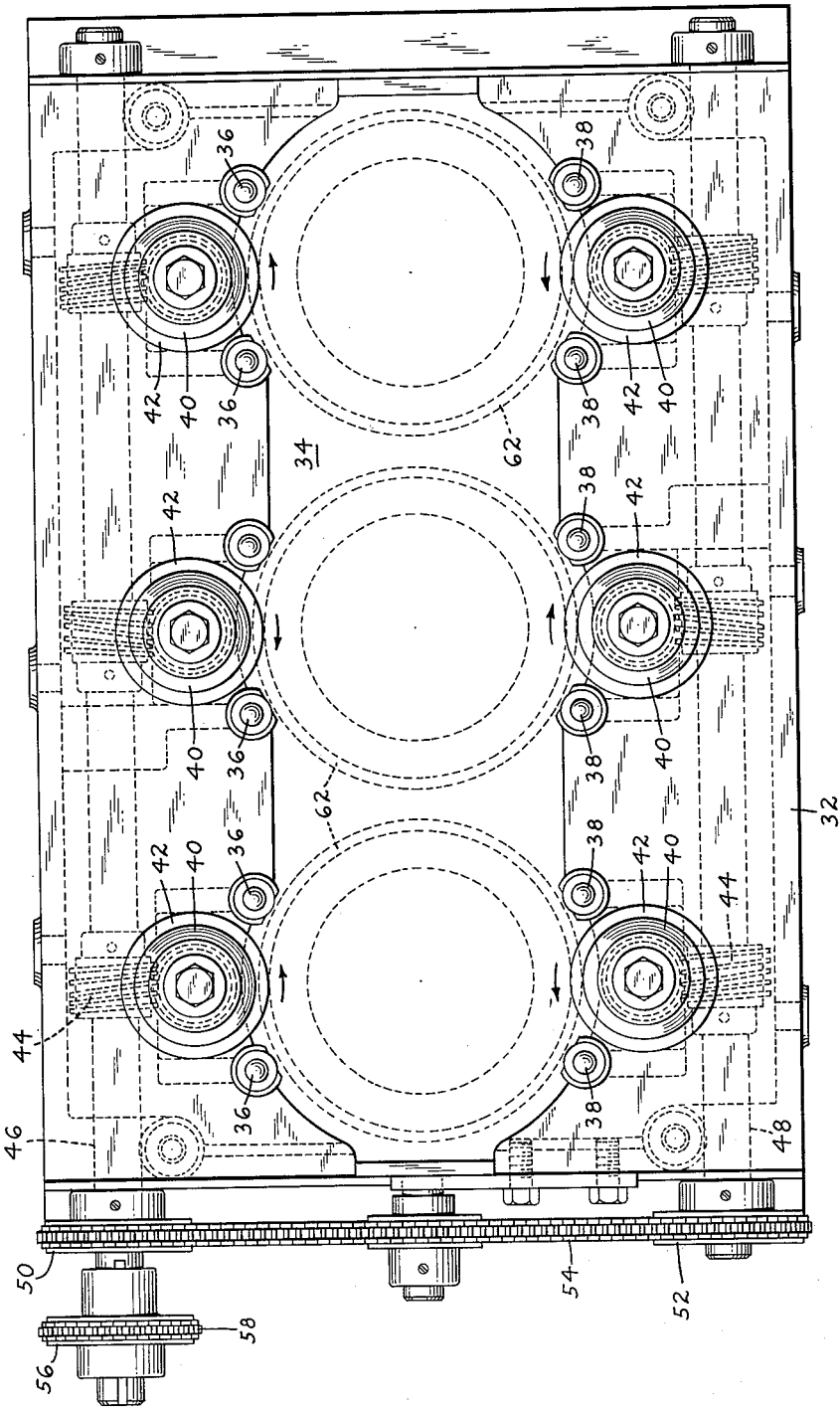

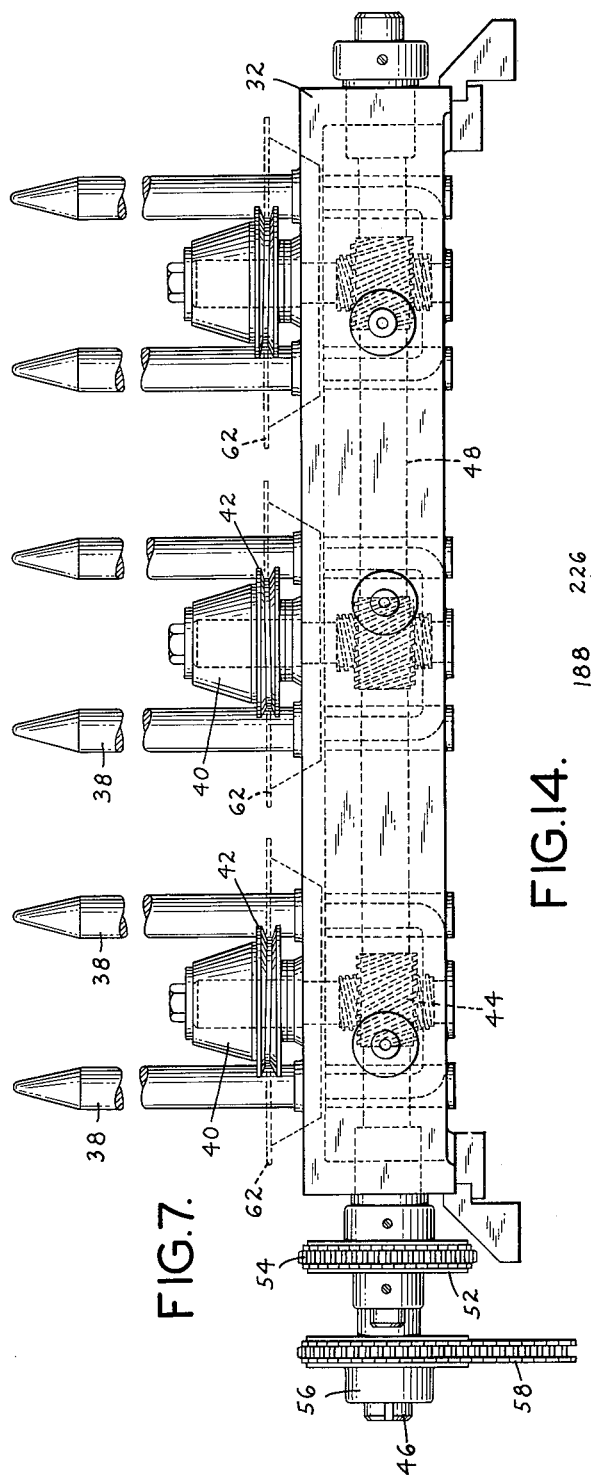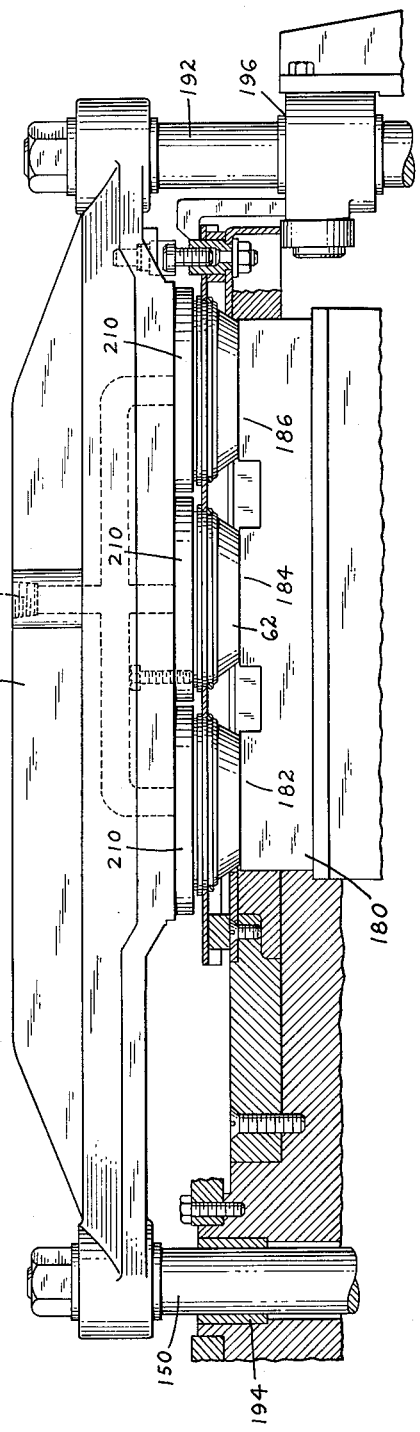

June 9, 1964  L. M. GAGEANT  3,136,268
AUTOMATIC PIE MACHINE
Filed Oct. 30, 1961
19 Sheets-Sheet 7

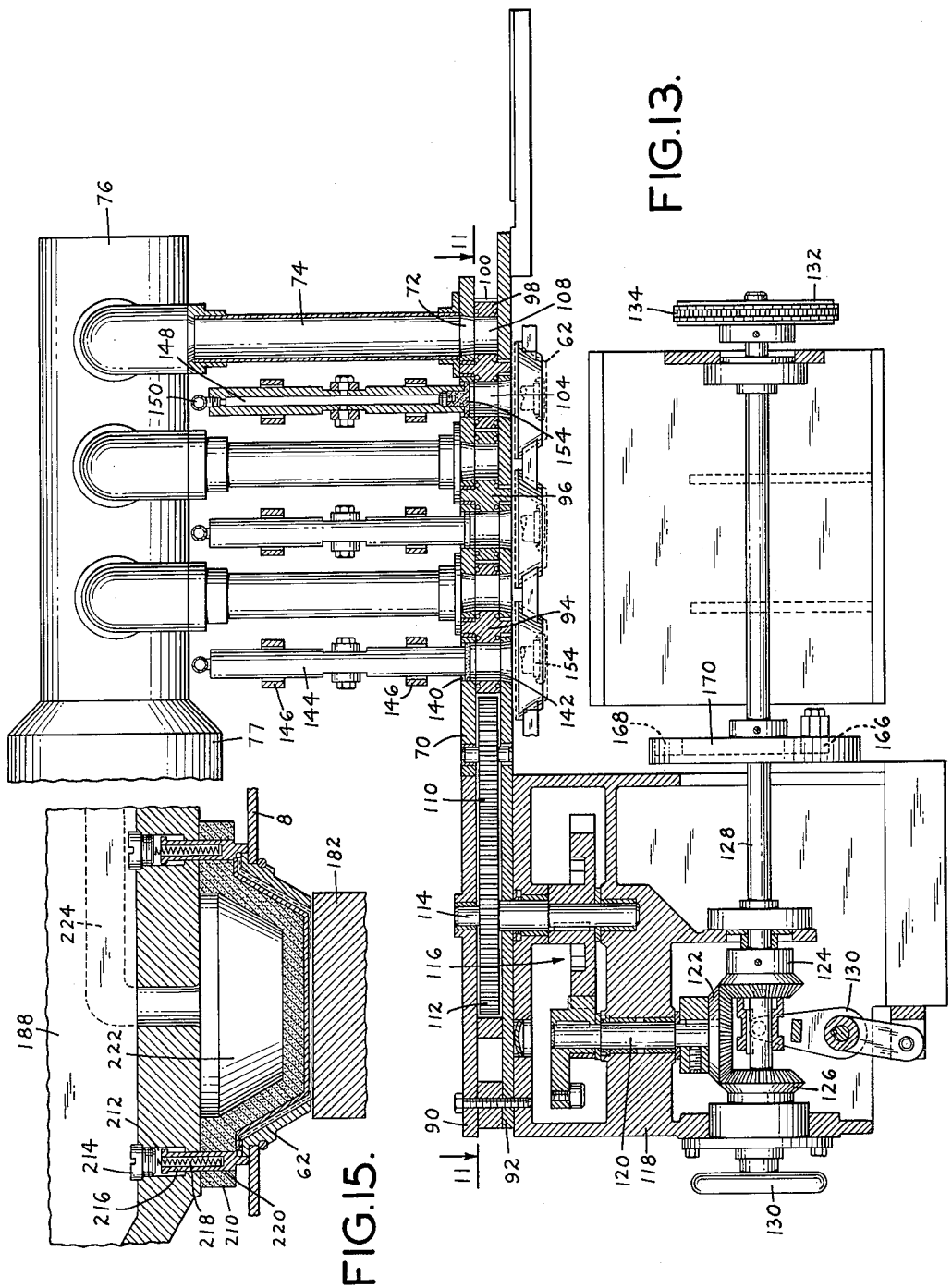

June 9, 1964  L. M. GAGEANT  3,136,268
AUTOMATIC PIE MACHINE
Filed Oct. 30, 1961  19 Sheets-Sheet 11

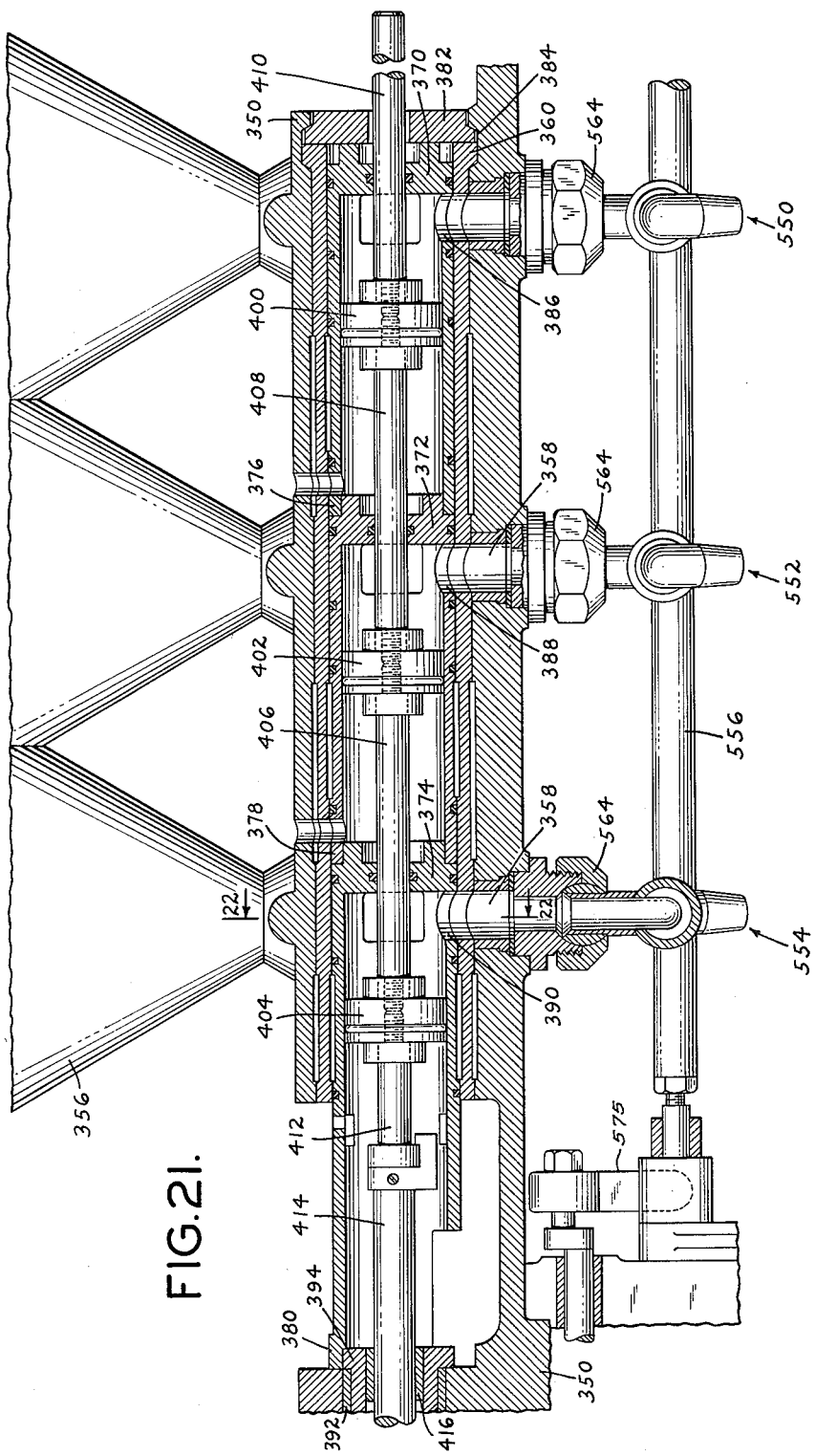

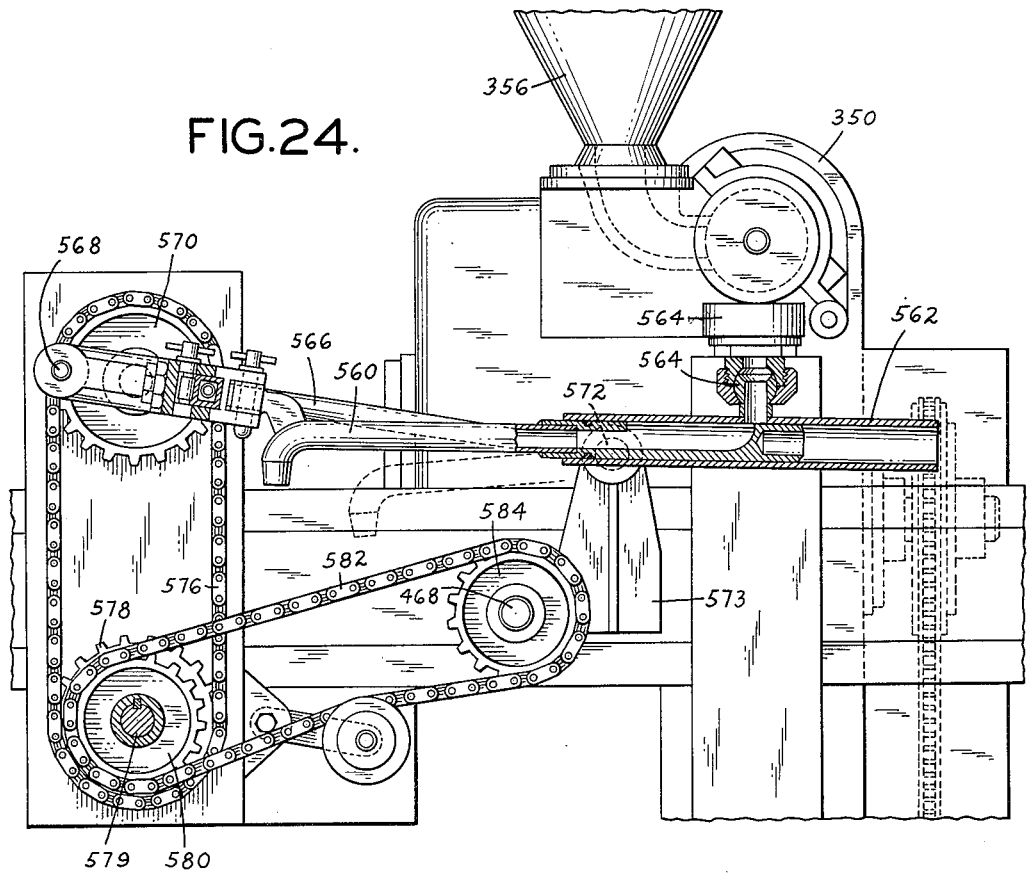
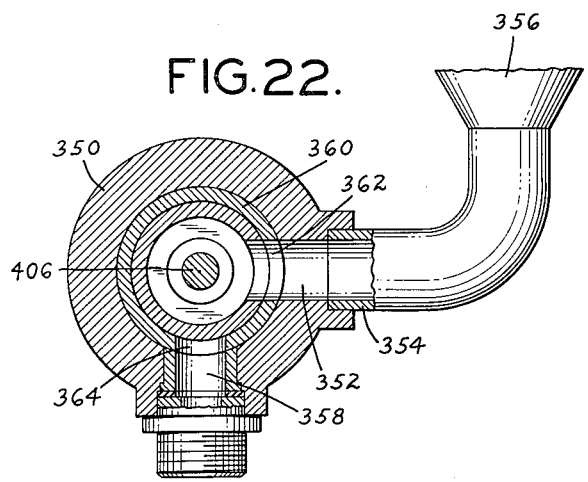
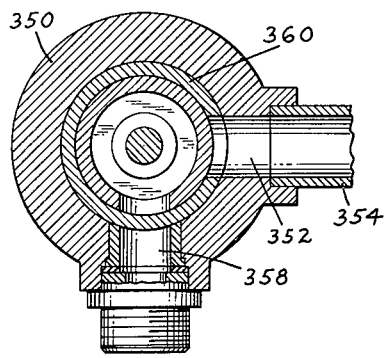

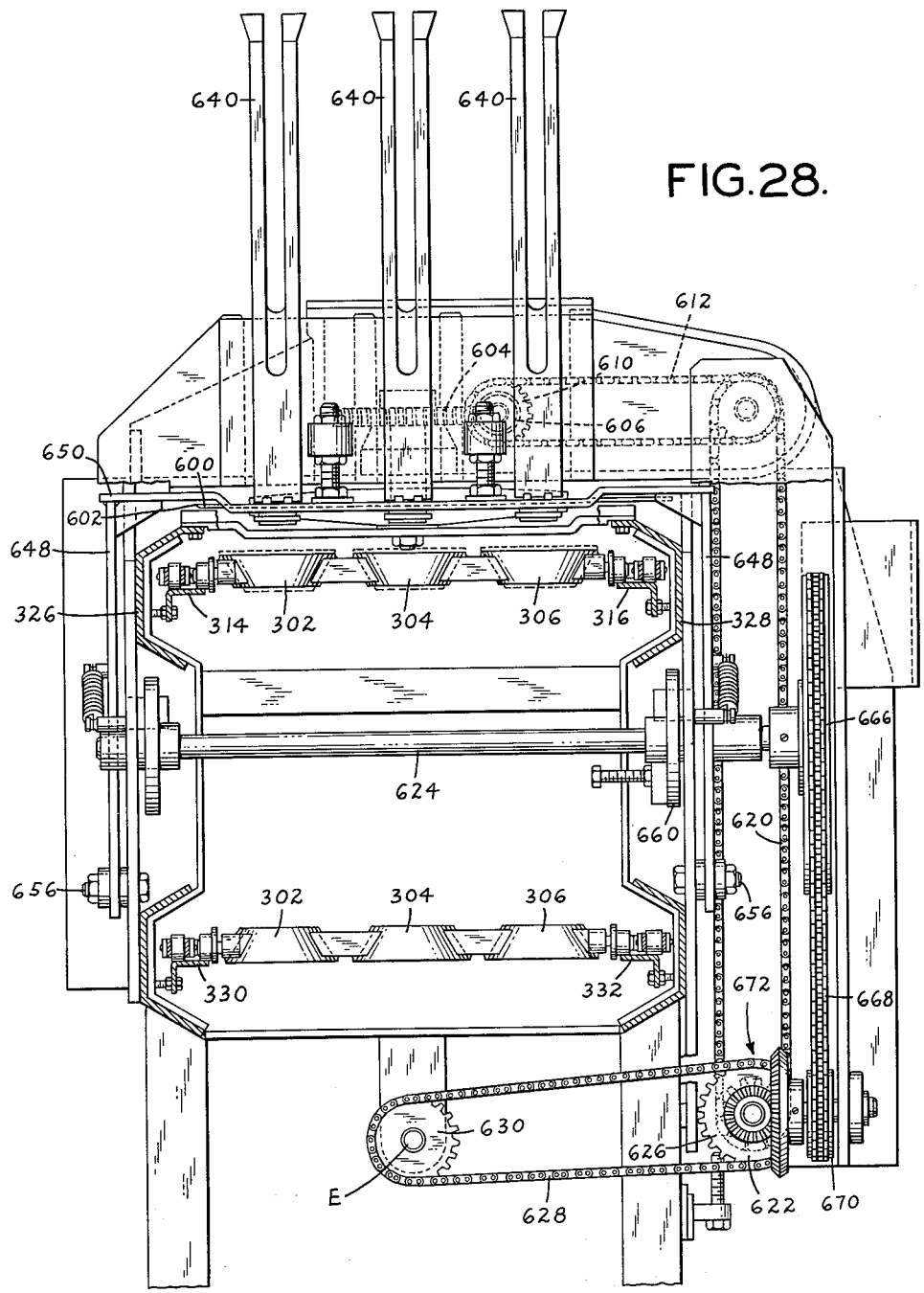

June 9, 1964   L. M. GAGEANT   3,136,268
AUTOMATIC PIE MACHINE

Filed Oct. 30, 1961   19 Sheets-Sheet 16

June 9, 1964

L. M. GAGEANT 3,136,268

AUTOMATIC PIE MACHINE

Filed Oct. 30, 1961

United States Patent Office 3,136,268
Patented June 9, 1964

3,136,268
AUTOMATIC PIE MACHINE
Louis M. Gageant, Haddonfield, N.J., assignor to Campbell Soup Company, Camden, N.J., a corporation of New Jersey
Filed Oct. 30, 1961, Ser. No. 148,560
24 Claims. (Cl. 107—1)

This invention relates to a machine for making pies and, more particularly, to such a machine in which a pastry pie cup is formed in a pan and filled in a continuous and uniform operation.

In pie making, as heretofore practiced, flour, shortening, and minor amounts of other ingredients, are mixed and blended into a pastry dough. After blending, the dough is rolled into a sheet and placed over a pan. The dough is then shaped into the pan to form a pan lining. To prevent soggy or soft, uncooked areas in the pastry after subsequent baking, after forming the dough should be in intimate contact over the entire inner surface of the pan.

To assure that the pan will be completely lined with the dough, it is the usual practice to make the dough sheet slightly larger than required to line the pan and to allow the excess dough to extend outwardly beyond the pan edge. This excess dough is trimmed off either before or after the lining has been filled with the pie ingredients.

After lining with the dough, the lined pan is filled with a filling which may be meat, fruit, or some other filling ingredient. In some instances, after filling, a dough or pastry cover may be placed over the pan and the filling. The cover is usually formed by placing a sheet of dough over the pan slightly larger than required to cover the pan and filling. The excess dough extends outwardly beyond the edge or lip of the pan and overlaps the edge of the dough lining. In order to hold the filling in the pie, the overlapping edges of the pastry lining and cover may be crimped together to form a seal in the dough around the edge of the pan. This crimping operation may be combined with the trimming of the excess dough. As the excess dough in the liner and cover is trimmed from the edge of the pan, the liner and cover are crimped together to form the seal.

In forming the dough sheet for both the pan lining and the cover, it is the usual practice to roll the dough into a sheet on a flat surface with a rolling mechanism, such as a rolling pin, or the like. Because the dough is adherent, raw flour is dusted over both the flat surface and the rolling surface to keep the dough from sticking to the respective surfaces and, at the same time, allow the dough to flow and be worked into the sheet. A part of this additional flour sticks to the dough and becomes an unblended part of the pastry lining and cover. While the amount of flour added to the dough in a single operation is only slight and can, for most purposes, be ignored, where the dough trimmed during each operation is repeatedly returned for reuse, the effects of repeated additions of flour can have an adverse effect on the quality of the pastry.

Various proposals have, from time to time, been made for machinery for producing pies. Many of these proposals have been directed toward the mecehanization of various of the operations previously performed by hand. Some of these proposals have been adopted and have been used in commercial production of pies. However, even with the adoption of these various mechanical devices, many of the operations are still performed by hand. For example, some of the filling operations are still performed by hand. Thus, the amount of filling and the proportioning of the filling ingredients is at the fancy of the operator. This, of course, usually results in non-uniform filling and inaccurate and inconsistent quality.

As important as uniform and accurate filling is to quality, probably the most important part of a pie is the pastry. Since the pastry, in addition to being a container for the filling, is an eatable part of the pie, its quality is of substantial importance. In machines employed in present commercial operations, the pan lining and pastry lid are formed substantially in the same manner as described above. That is, the dough is rolled into a sheet, put in place, and trimmed. The trimmings are fed back and reworked with the raw dough. While such reworking of the trimmings reduces the cost of the pie, such reuse and reworking tends to make the pastry tough. This toughness is, of course, not desirable.

In addition to toughening the final pastry, recycling and reworking of the trimmings adversely affects the quality of the pastry in other manners. While the amount of unblended flour added during the sheeting operation of the dough in making a single pie may not significantly affect quality, where the dough is repeatedly recycled and reused, the accumulation of unblended flour can become substantial. This unblended flour accumulation results in changes in both the properties and appearance of the pastry. For example, where substantial amounts of unblended flour are present, the pastry, after baking, is dull and nonuniform and may even contain white flour streaks.

Recycling and reusing of the sheet trimmings causes yet another problem. Any contamination of the trimmings before they are fed back into the raw dough for recycling results in contamination of the dough. For example, any excess filling material spilled out of the pie may be taken up by the trimmings and become mixed with the raw dough. This, of course, has an appreciable effect on the quality and appearance of the final pastry and the pie.

It is an object of the instant invention to provide an improved pie making machine.

It is a further object to provide such a machine in which the pie is made in a continuous mechanical operation.

It is a still further object of the invention to provide such a machine in which the entire pie making operation is carried out mechanically.

A still further object is to provide such a machine which will make pies of uniform quality and appearance.

Still a further object is to provide such a machine in which the pastry dough is metered and formed in both the pan liner and cover without forming trimmings or recycling such trimmings.

A still further object is to provide such a machine in which the addition of unblended flour to the dough is eliminated.

These and other objects will be more apparent from the following description and attached drawings showing an embodiment of the invention in which:

FIG. 1 is a top plan view of a machine in accordance with the invention;

FIG. 2 is a side view of the machine of FIG. 1;

FIG. 4 is a side elevation view of the apparatus of FIG. 3;

FIG. 5 is a top plan view, in enlarged detail, of the pan dispenser of FIG. 1;

FIG. 7 is a side elevation view of the pan dispenser of FIG. 5;

FIG. 13 is a side elevational view showing the dough dispenser, dough dispenser drive and dough dispenser plunger;

FIG. 14 is a side view, partly in section, of the cup former of FIG. 1;

FIG. 15 is a side view, in enlarged detail and in section, of the cup former head;

FIG. 21 is a side view, in enlarged detail and partly in section, showing the garnished gravy dispenser of FIG. 20;

FIG. 22 is a view, partly in section, taken along the line 22—22 of FIG. 21, showing details of the garnished gravy dispensing valve;

FIG. 23 is a view similar to FIG. 22 but showing the garnished gravy dispensing valve in feeding position;

FIG. 24 is an end view, in enlarged detail and partly in section, showing the garnished gravy dispenser and gravy feed tube;

FIG. 28 is a side view, in enlarged detail, of the meat dispenser of FIG. 1 and showing a portion of the meat dispenser drive;

Figure 3:
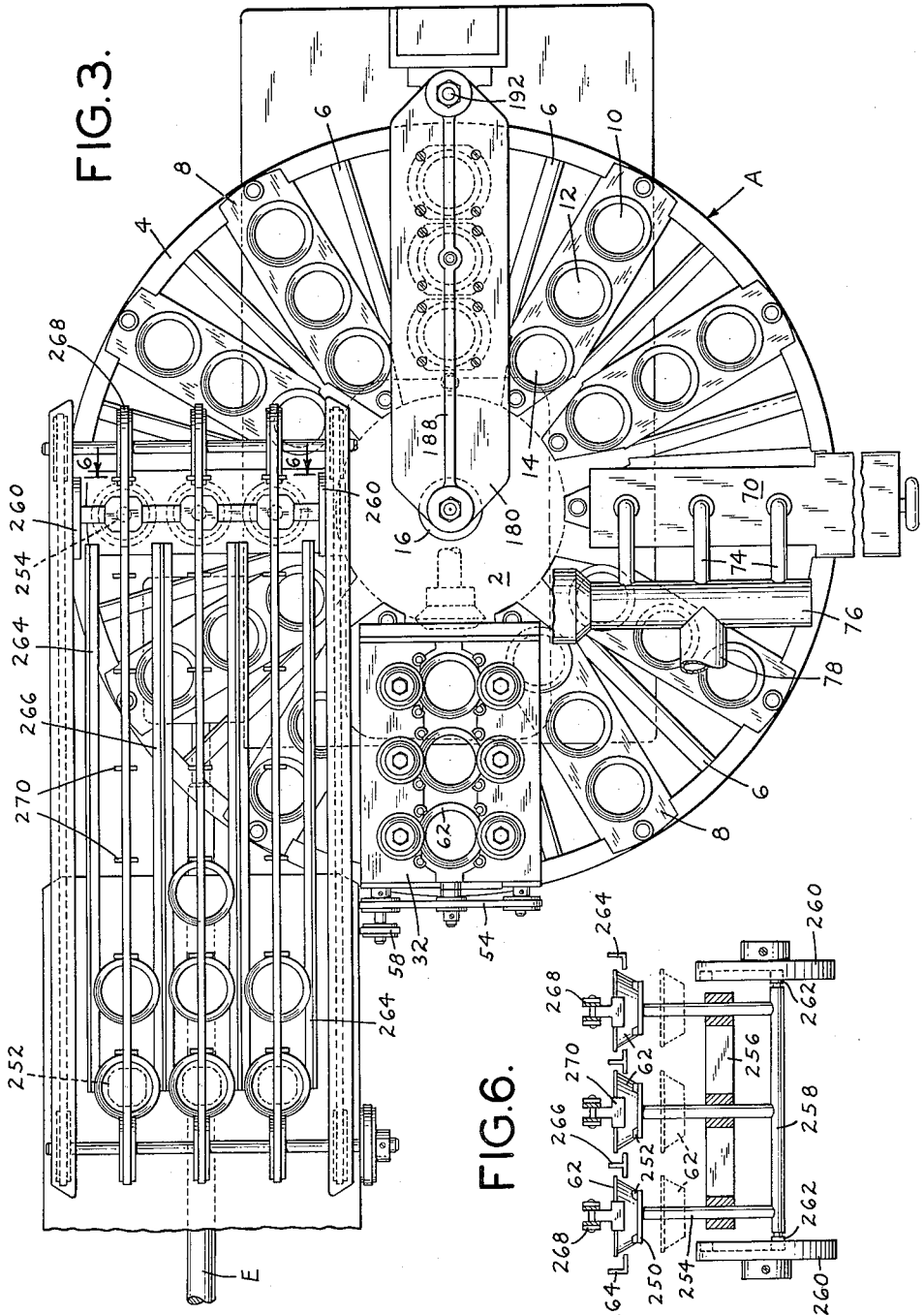
FIG. 3 is a top plan view, in enlarged detail, of the conveyor arrangement at the right of FIG. 1 and showing, the pan dispenser, the dough dispenser and former apparatus.

In the instant invention the entire pie making operation is performed mechanically. After the pastry dough ingredients are mixed and blended, a metered amount of dough is fed into a pan and formed, in the pan, as a liner. The dough lined pan is fed through a series of stations where the various filling materials are metered into the pan. After the lined pan has been filled, a dough lid is placed over the pan and the edges of the lid crimped to the edges of the pan lining. The completed pie is fed from the machine and may then be cooked or frozen, or packaged and stored for later cooking or freezing, as the case may be.

By metering and forming the dough lining and lid in accordance with the invention, only that quantity of dough necessary to form the lining and lid, respectively, is fed and handled during each operation. Thus, the trimming of excess dough is eliminated and handling and reworking of the trimmed dough is avoided. The lack of handling and reworking of the dough allows more uniform control and higher quality pastry.

As will be described in more detail hereinafter, the dough is not rolled and sheeted as has heretofore been the practice, but, rather, is press formed. The pressing operations are performed with special types of dies, each of which is provided with means whereby the dough can be parted from the forming surface without powdering of the surface or the dough with flour or other parting material. Thus, after the flour, shortening and other ingredients have been blended, the need for adding additional flour or other material to part the dough from the forming surface is eliminated. Hence, proper dough formulation can be followed and uniformity of the pastry can be attained.

In the attached drawing illustrating one embodiment, the invention is shown as applied to a machine for producing three pies simultaneously. It is to be understood that the invention may be applied with equal advantage to a pie line where the pies are formed one at a time, as well as to lines where a greater number of pies are formed simultaneously.

Referring now to the drawings, in FIGS. 1 and 2 there is shown a machine having a rotatable table, generally indicated A, and an endless belt conveyor, generally indicated B. The pie, as it is formed, is moved counterclockwise around table A and from the right to the left of conveyor B as viewed in FIGS. 1 and 2.

Table A is rotated in the direction of the arrows of FIG. 1. Positioned in fixed location in counterclockwise order around table A are a pan dispenser, a dough dispenser and a cup former. Conveyor B is aligned at one of its ends with rotatable table A to receive pies, in process, from table A, a pan transfer mechanism being positioned between table A and conveyor B to effect the transfer of the pies from the table to the conveyor. As the pies, in process, are received on conveyor B, they are moved from right to left, as shown in FIG. 1, and are passed in order under a garnished gravy dispenser, a meat dispenser, a lid maker and fixer and a lid crimper. At the end of the conveyor, the pie is taken off the conveyor B by a pan elevator.

For ease in operation and timing, table A, conveyor B and the various operating units of the machine are operated by a motor C connected by coupler D to a main drive shaft E extending longitudinally of conveyor B, the respective units being connected to the drive shaft by couplings and gearing arrangements.

Referring now to FIGS. 3 and 4, table A is in the form of a wheel having, at its center, a hub 2 and, at its periphery, a rim 4, hub 2 and rim 4 being connected by a plurality of radially extending spokes 6, spaced equidistant around hub 2. Pallets 8, each fixed at its opposite ends to hub 2 and rim 4, respectively, are carried intermediate each pair of spokes 6.

Circular openings 10, 12, 14 extend vertically through pallet 8 intermediate the ends of the pallet. Each opening 10, 12, 14 is of a size large enough to receive the recessed portion of a pie pan or tin, the pie pan being supported in the pallet by engagement of the rim of the pan with the pallet at the periphery of the opening.

At its center, hub 2 is fixed to one end of shaft 16, shaft 16 supporting table A for rotation about the axis of the shaft. Shaft 16 is connected to drive shaft E through an intermittent indexing drive mechanism, generally indicated 20. Any conventional indexing drive mechanism which will provide an intermittent indexing drive at the output shaft when the input shaft is driven continuously may be employed for this purpose. One such indexing drive which has been employed for this purpose is a Ferguson drive, shown and described in Bulletin No. 402 of Ferguson Machine Corporation. The input shaft 22 of indexing drive 20 is keyed to pulley 24 which is connected by belt 26, pulley 28 and gear box 30 to drive shaft E.

As best shown in FIGS. 3, 4, 5 and 7, the tray dispenser includes a base 32 mounted in fixed horizontal position and extends radially above table A. Base 32 has, in its center, an opening 34 extending through base 32 intermediate hub 2 and rim 4. Guideposts 36, 38 fixed to base 32 at the opposite sides of opening 34 extend vertically upward from base 32 and are arranged in pairs at the opposite sides of the opening. Intermediate each pair of giudeposts 36, 38 and mounted for rotation about a vertical axis on base 32 are worm wheels 40, each provided at its marginal edge with a spirally extending tooth 42. Worm wheels 40 at the opposite sides of opening 34 are connected by gears 44 to shafts 46, 48 respectively. Shafts 46 and 48 are mounted for rotation on base 32 and are driven by sprockets 50, 52, respectively, interconnected by chain 54. Sprocket 56 is keyed to shaft 46 and is connected by chain 58 to drive shaft E through gear box 30 and intermediate drive 60.

In operation, pie pans 62 are nested and stacked in the tray dispenser intermediate guideposts 36, 38. Guideposts 36, 38 are positioned to guide the pans, without interfering with the gravity feed of the pans, downward toward base 32. When stacked in the dispenser, the lip or marginal edge of the lowermost pan 62 is in contact with the upper side of tooth 42 on worm wheel 40. As best shown in FIG. 5, worm wheels 40 are positioned at the opposite sides of the stacked pans 62 and are synchronized so that, as the worm wheels 40 are turned, the spiraled tooth 42 at the edges of the opposite wheels, acts as a parting blade on the edge of the pan, parting the lowermost pan 62 from the bottom of the stack and, as the wheels turn, releases the pans one by one onto pallet 8, the rotation of worm wheels 40 and table A being timed so that, as pallet 8 is in proper position beneath the pan dispenser, the released pan 62 is dropped from the pan dispenser into the circular opening in the pallet. With pans 62 in the circular openings 10, 12, 14 of pallet 8, table A, through the indexing drive 32, is rotated, bringing pallet 8 with pans 62 to the dough dispenser.

Referring now to FIGS. 8 to 13 inclusive, the dough dispenser includes a fixed head 70 mounted in fixed position above table A. Head 70 is provided with three dough passages 72, each connected by a conduit 74 to a manifold 76 provided with a constant pressure chamber 77 having a piston 79. At its outlet end, a constant displacement pump 78, having a screw plunger 80, is connected to manifold 76, the inlet end of pump 78 being connected to a dough supply hopper 82. Pump 78 is driven by motor 84.

As best shown in FIGS. 8, 11, 12 and 13, fixed head 70 includes spaced plates 90, 92 forming, therebetween, a housing in which are rotatably mounted dough metering discs 94, 96, 98 having, at their respective peripheries, gear teeth 100, the teeth on the respective gears being intermeshed so that the metering discs are rotated in timed relationship. Each of the discs 94, 96, 98 is provided with a plurality of passages 102, 104, 106, 108, spaced equidistant around the disc and, for reasons more apparent hereinafter, forming a metering passage through the disc.

Gear 110, rotatably mounted intermediate plates 90, 92, is in driving engagement with gear teeth 100 on metering disc 94 and with gear 112 rotatably mounted intermediate plates 90, 92.

Referring particularly to FIG. 13, gear 112 is keyed to shaft 114 and through shaft 114 is connected to the driven wheel of a Geneva drive, generally designated 116, keyed to the opposite end of shaft 114 in housing 118 connected beneath head 70. The drive wheel of Geneva drive 116 is keyed to shaft 120, rotatably mounted in housing 118, shaft 120 being keyed, at its opposite end, to spur gear 122.

Spur gear 122 is in driving engagement with spur gears 124, 126, spur gear 124 rotatably carried on shaft 128 for driving connection with shaft 128 by a shifting mechanism, generally designated 130. Spur gear 126 is connected to a hand operated wheel 130. At its end opposite spur gear 124, shaft 128 is keyed to sprocket 132, connected by chain 134 (FIG. 4) to sprocket 24 and, by chain 26 and sprocket 28, to reduction gear 30 and drive shaft E.

In addition to the passages 72 in head 70, plates 90 and 92 on head 70 are provided with aligned passages 140, 142. Plunger 144 mounted for reciprocal movement in supports 146 is positioned above head 70 in axial alignment with passages 140, 142. For reasons more clearly recited hereinafter, an air passage 148 extends axially through plunger 144, passage 148, at its upper end, being connected by fitting 150 to an air supply conduit 152. At the opposite end of passage 148 adjacent head 70, a porous metal disc 154 is fixed to the end of plunger 144, porous metal disc 154 being in communication with air passage 148.

Figure 12:
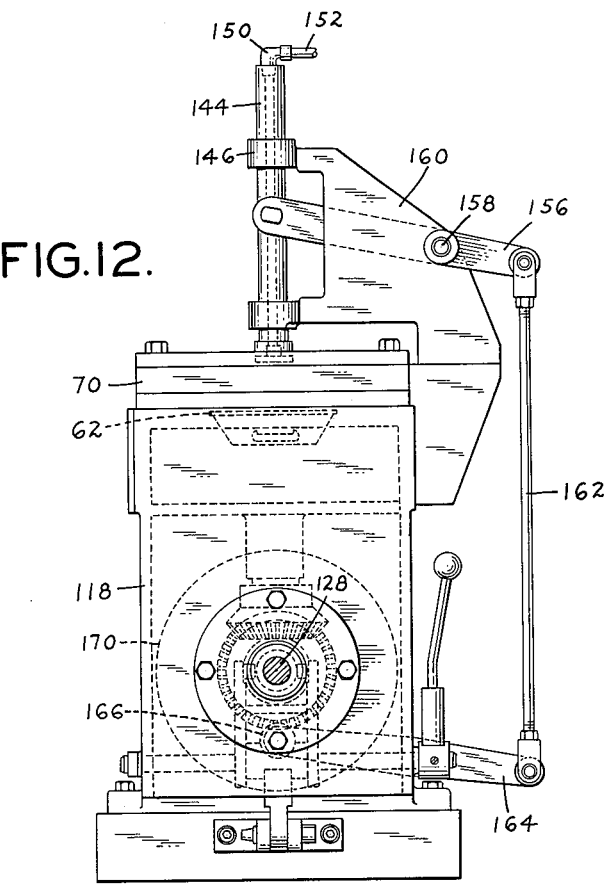
FIG. 12 is a side elevational view of the dough dispenser apparatus showing the dough dispenser plunger and the drive therefor.

Referring to FIGS. 12 and 13, intermediate its ends plunger 144 is connected to arm 156 pivotally connected at 158 to frame 160. Arm 156 is connected at its opposite end by a push rod 162 to one end of arm 164. Intermediate its ends arm 164 is pivotally connected to housing 118 and, at its opposite end, carries cam follower 166 operatively engaged in cam track 168 of a cam 170 keyed to shaft 128 for rotation therewith.

In operation the blended dough ingredients are placed in supply hopper 82 and are fed by plunger 80 to manifold 76, pump 78 maintains the dough in manifold 76 under pressure forcing the dough from manifold 76 into conduit 74. In order to maintain the dough in manifold 76 and conduit 74 at a substantially constant pressure, as the pressure in manifold 76 increases, the pressure of the dough forces piston 79 in constant pressure chamber 77 outward to maintain the dough pressure in manifold 76 substantially constant. If desired, piston 79 of constant pressure chamber 77 may be connected to the power supply of motor 84 to regulate the speed of the motor and the feed of pump 78 and plunger 80 by increasing and decreasing the speed of the motor or by operating motor 84 intermittently. In any event, the dough pressure in conduits 74 and manifold 76 should be maintained substantially uniform.

Figure 8:
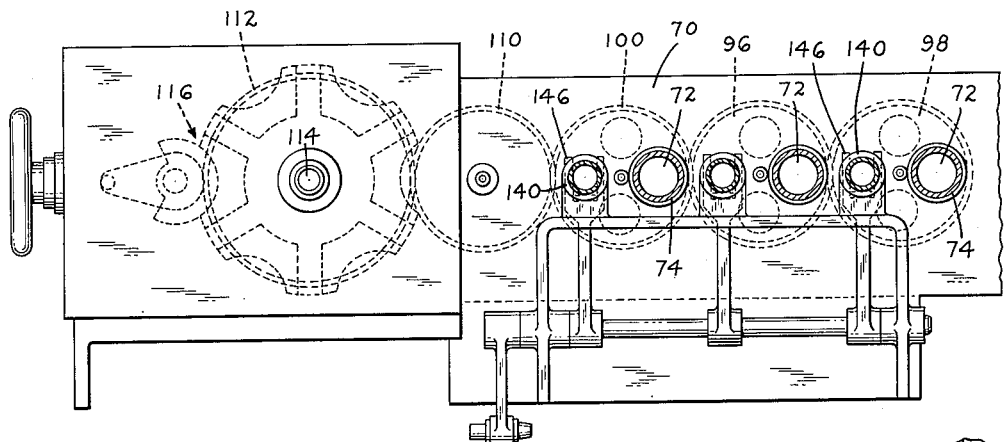
FIG. 8 is a top plan view, in enlarged detail, of a portion of the dough dispenser apparatus of FIG. 1.
Figure 36:
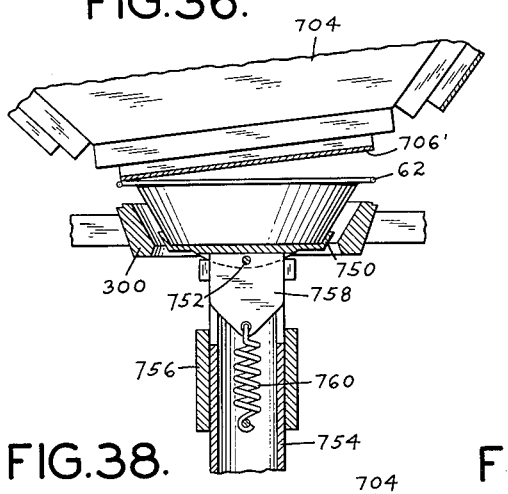
FIG. 35, FIG. 36, FIG. 37 and FIG. 38 are views, partly in section, showing various positions of the lid affixing apparatus as the lid forming head deposits the dough lid thereon.
Figure 35:
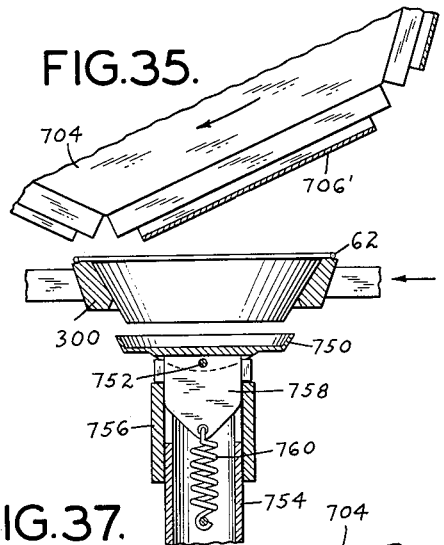
Figure 38:
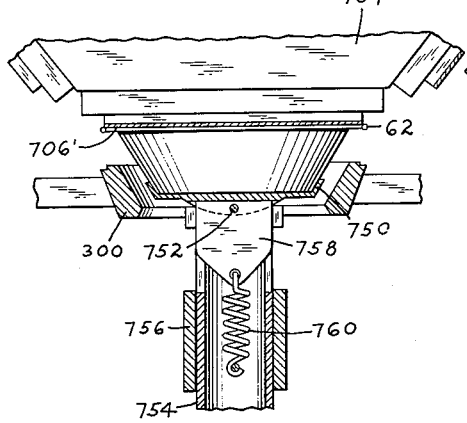
Figure 37:
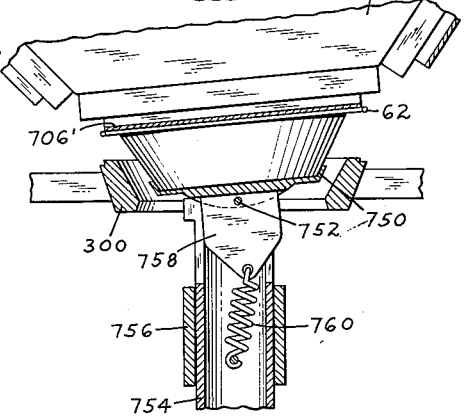

As best shown in FIGS. 8 and 13, dough metering discs 94, 96, 98 are rotated in indexing steps in head 70 by gears 110, 112 and Geneva drive 116. In the embodiment of the invention shown, dough metering discs 94, 96, 98 are each provided with four passages 102, 104, 106, 108 spaced at 90° intervals around the respective discs. Thus, Geneva drive 116 is set to rotate the metering discs 90° on each indexing movement of the Geneva drive and to lock the metering discs in position. As each of the passages pass beneath the openings 72 in head 70, the passage is filled with dough, forming a biscuit-like dough slug filling the passage. As the metering disc is indexed by Geneva drive 116, the dough-filled passage is indexed into alignment with the passages 140, 142 in plates 90, 92, respectively, of head 70.

Plunger 144, through arms 156, 164, push rod 162, cam follower 166, and cam 170, is timed with the indexing rotation of the metering discs so that, as the passage in the metering disc containing a dough biscuit is brought into alignment with passages 140, 142, by Geneva drive 116, plunger 144 is actuated downwardly, as shown in FIG. 13, forcing the disc downwardly out of the passage in the metering disc through passage 142 and into pan 62, as shown in dotted line in FIGS. 12 and 13. In moving downwardly plunger 144 positions the dough biscuit or slug in the approximate center of the pan, the downward travel of plunger 144 being regulated to press the dough biscuit against the bottom of the pan and to more or less stick the dough slug to the pan at its approximate center.

The diameter of porous metal disc 154 fixed to the bottom end of plunger 144 is approximately the same diameter as the diameter of the passages 140, 142 in plates 90, 92, respectively, and the passage in the dough metering disc. Thus, during the downward movement of the plunger the bottom surface of disc 154 contacts the dough slug, forcing the dough slug downward, out of head 70 into pan 62. In order to part the dough slug from porous metal disc 154 air, under slight pressure, is fed from conduit 152 and fitting 150 into passage 148, the air flowing outwardly through the end of porous metal disc 154. This air flow, when the dough biscuit is forced out of head 70 into pan 62, parts the dough slug from plunger 144 and porous metal disc 154 as the plunger is moved upwardly away from pan 62.

The indexing operation of metering discs 90, 96, 98 by Geneva drive 116 and the upward and downward movement of plunger 154 is timed to the rotation of shaft 128 by cam 170 so that the plunger moves upwardly and downwardly while the metering discs are in locked indexed position. After the dough biscuit has been deposited in the pan, plunger 144 moves upwardly out of the passage in the metering disc and remains in its upward, withdrawn position, while Geneva indexing drive 116 rotates metering discs 94, 96, 98 to the next indexing position bringing the following passage in discs 94, 96, 98 into alignment with the passages 140, 142 in head 70. With the following passage in alignment with passages 140, 142 and with the metering discs locked by Geneva drive 116, plunger 144 again moves downwardly depositing the following dough slug in the approximate center of empty pans 62 which have been brought into alignment under head 70 by the intermittent indexing drive of table A.

From the dough dispenser pans 62 containing the dough slugs are moved to the cup former where the dough slug is shaped or formed in pan 62. After forming, the dough lines the entire interior surface of the pan.

Referring to FIGS. 4, 14 and 15, the cup former includes a base 180, positioned beneath rotatable table A, the upper surface of base 180 having upwardly extending pedestals 182, 184, 186. The upper surface of pedestals 182, 184, 186 form supporting surfaces for pans 62 during the dough forming operation and are positioned beneath table A a sufficient distance to allow table A, with pans 62, to rotate without interference from the pedestals.

Positioned above, and in vertical alignment with, base 180 is a movable head 188. At its opposite ends and supporting head 188 for vertical movement toward and away from base 180 are columns 190, 192, mounted for vertical movement in bearings 194, 196, respectively. Cam follower 198, in operative engagement with cam 200, is attached to the lower end of column 192. Cam 200 is keyed to shaft 202 for rotation therewith, shaft 202 being driven from drive shaft E through reduction gear 30.

As shown in FIGS. 14 and 15, head 188 is provided with a plurality of dies 210 of porous metal. In the embodiment of the invention illustrated, since three pans are processed simultaneously at each station on the machine, head 188 is provided with three dies 210. For reasons more apparent hereinafter, head 188 is provided with counter bores 212 threaded at their upper end to receive a stop 214 and, in their lower end, having a guide pin 216 urged outwardly in the counter bore by a spring 218. Guide 216 extends outwardly from the lower face of head 188 through a hole 220 in porous metal die 210. Die 210 has a chamber 222 connected by a passage 224 in head 188 to an air supply conduit 226.

In operation, after pans 62 have received a dough slug at the dough dispenser, table A is indexed and pans 62, with the dough slugs therein, are brought into registry with dies 210 on head 188. In this position the bottom of pans 62 are on top of pedestals 182, 184, 186. With the pans in indexed position under dies 210, cam 200 which is rotated by shaft 202 through the action of cam follower 198 and column 190, 192, moves head 188 downward bringing dies 210 into pans 62. As head 188 moves downwardly, pins 220 contact the marginal edges of pan 62, continued downward movement of head 188 forcing pins 220 upward into the counter bore 212 of head 188, compressing springs 218.

As die 210 moves downwardly into pan 62 porous metal die 210 engages the dough slug squeezing the slug downwardly in the bottom of pan 62, forcing the dough into the bottom of the pan, upwardly along the upstanding sides of pan 62 and outwardly along the lip of the pan. The volume of the dough slug and the travel of head 188 is regulated in such a manner that, when head 188 reaches the end of its travel, the dough occupies the clearance space between die 210 and pan 62 without any of the dough extending beyond the marginal edges or lip of the pan.

As aforestated, die 210 is of porous metal. Air under slight pressure is fed to chamber 222 and through die 210 from air supply conduit 224, 226, a slight and uniform air flow resulting through porous metal die 210. As head 188 and die 210 are moved upwardly away from pan 62 the air flow through the porous metal die 210 parts the dough lining from the die, pins 220, through compression springs 218 force the pan 62 away from head 188, leaving pan 62 and the formed dough liner in place in pallet 8.

With the pan liners formed and head 188 and dies 210 withdrawn from the pan and formed liner the indexing drive of table A again moves the pans in the direction of the arrow in FIG. 1, removing pans 62 with the formed dough liner from the pan former and delivering the next set of pans with dough slugs to the cup former for the liner forming operation.

After the dough liner has been formed in the pan, the dough lined pan is filled with the pie ingredients and the lined and filled pan is covered. In order to insure uniform filling and constant quality, the various filling ingredients are proportioned and added to the dough lined pan individually, the dough lined pan being advanced from station to station to receive each of the ingredients.

Figure 6:
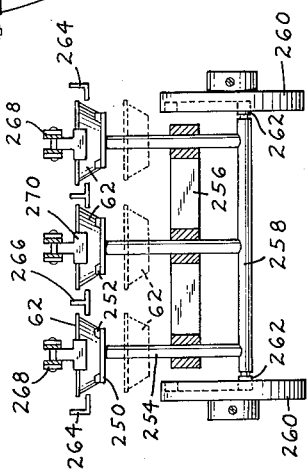
FIG. 6 is an end view, partly in section, of the pan transfer apparatus of FIG. 1.

As shown in the attached drawings (FIGS. 1, 2, 3, 6 and 16), the lined pan 62 is removed from table A and transferred to conveyor B where, as the filled pan is conveyed along conveyor B, the various ingredients are fed into the lined pan, the lid is formed and positioned on the filled pan, and the filled and covered pan is removed from the conveyor. As best shown in FIGS. 3 and 6, the lined pans 62 are lifted out of the pallet on table A by a pan transfer mechanism and transferred to pallet 300 carried on conveyor B.

The pan transfer includes a plate 250 (FIG. 6), substantially the size of the bottom of the pan, plate 250 being provided at its edge with lugs 252 adapted to engage the sloping side of the pan 62 for reasons more apparent hereinafter. Bar 254, slidably mounted in a fixed support 256, is attached to the bottom of plate 250, bar 254 being fixed at its opposite end to cam follower 258 connected to cams 260 by rollers 262. Cams 260 are driven from drive shaft E and are synchronized with the balance of the drive of the machine. Tracks 264, 266 are positioned above table A and extend from a position above table A to a position above conveyor B. Chains 268, having spaced lugs 270, are positioned above and intermediate tracks 264, 266. Chains 268 are driven from drive shaft E through sprocket 270 and chain 272.

Figure 18:
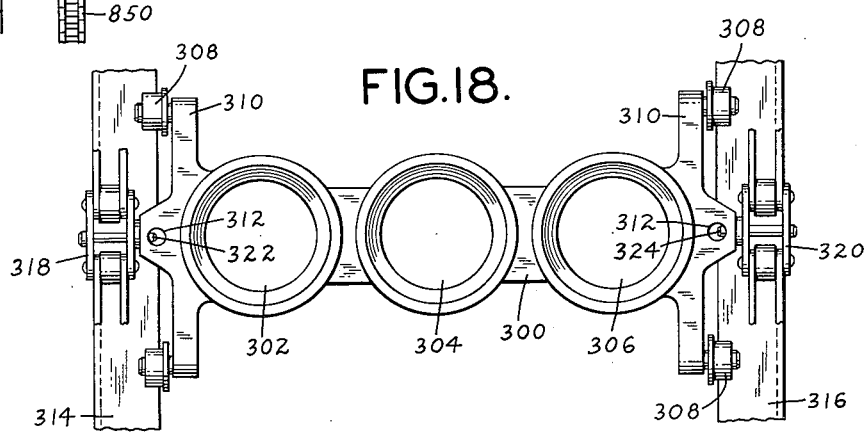
FIG. 18 is a top view, in enlarged detail, showing the conveyor pallet.

In operation, when the lined pans 62 arrive in pallet 8 at the pan transfer, cams 260 elevate plates 250, raising plates 250 into engagement with the bottom of the lined pan. As cams 260 further raise plate 250, lined pan 62 is lifted out of the opening in pallet 8 and raised above the pallet to a position adjacent the end of tracks 264, 266. With the lined pan 62 in elevated position, lug 270 on chain 268, driven in the direction of the arrow in FIG. 4, contacts the edge of the rim of pan 62, chain 268 and lug 270 sliding pan 62 forward off plate 250, engaging the rim of pan 62 at its opposite sides with tracks 264, 266, respectively. With pan 62 resting at its rims on tracks 264, 266, chain 268, through lug 270, slides the pan along the track, moving the filled pan from right to left of FIGS. 3 and 4. When the pan reaches the forward end of the track, lug 270 pushes the pan off the end of the tracks and into the recess of pallet 300 on conveyor B (FIG. 18).

After the pan has been removed from plate 250, cam 260 withdraws plate 250 downward through the opening in pallet 8 to its initial position beneath table A. The drive of plate 250 and cam 260 is synchronized with the remainder of the machine so that during the interval when table A is stationary and pallet 8 and lined pan 62 are in fixed position, plate 250 elevates the lined pan from table A and transfers the lined pan to conveyor B.

Figure 16:
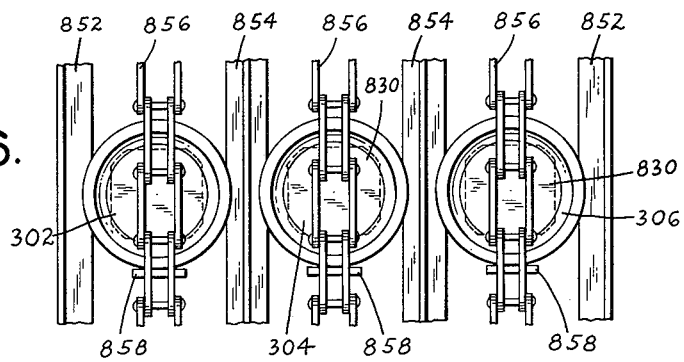
FIG. 16 is a top view, in enlarged detail, of the pan transfer of FIG. 1.
Figure 17:
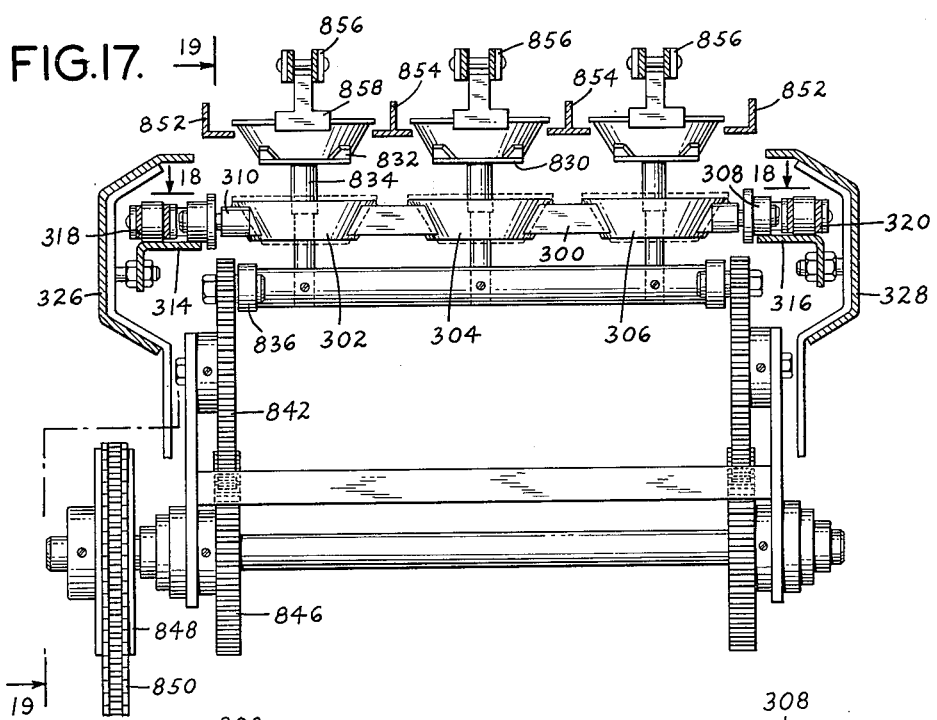
FIG. 17 is an end view, in enlarged detail, of the pan transfer apparatus of FIG. 1 showing the pan transfer drive.

As best shown in FIGS. 16 and 17 in the illustrated embodiment, pallet 300 is provided with three openings 302, 304, 306, each adapted to receive a pan 62. Rollers 308 are connected at the opposite ends of arms 310 extending outwardly from the opposite sides of pallet 300. At its ends pallet 300 is provided with openings 312. Rollers 308 engage spaced tracks 314, 316, tracks 314, 316 supporting pallet 300 as the pallet is moved along the tracks. Continuous chains 318, 320 are positioned at the opposite ends of pallet 300, chains 318, 320 being connected to pallet 300 by lugs 322, 324 engaging openings 312 at the opposite ends of the pallet. Tracks 314, 316 are connected to frame 326, 328, frame 326, 328 carrying tracks 330, 332 spaced below and parallel to tracks 314, 316. At the opposite end of conveyor B, endless chains 318, 320 pass over sprockets, not shown, which drive and guide the chains in a conventional manner, the drive for the sprockets being through gear box 340 (FIGS. 1 and 2) driven from drive shaft E.

In operation, conveyor B is synchronized with the drive of the balance of the machine so that, as a lined pan 62 is delivered from tracks 264, 266 by chain 268 and lugs 270, a pallet 300 is in position adjacent the end of tracks 264, 266 to receive the lined pan and to convey the pan along conveyor B to the various filling stations. In the illustrated embodiments of the invention, conveyor B is driven continuously in synchronism with table A, the lined pans being transferred from table A to conveyor B and are conveyed down the conveyor through the various filling stations to the end of the conveyor where they are removed from pallet 300 and pallet 300 is returned by continuous chains 318, 320 along tracks 330, 332. It is, of course, understood that a plurality of pallets 300 are positioned at spaced intervals along chains 318, 320.

As illustrated in the attached drawings, the lined pan 62 is first filled with a garnished gravy, meat is then added and the lid is formed, placed on the filled pie and the edge of the lid crimped to the dough lining of the pan. It is to be understood that, while the filling operation is described in connection with meat pies, other ingredients, such as in the making of fruit pies, may be substituted for the garnished gravy and meat.

Referring to FIGS. 20 through 27, the garnished gravy dispenser includes a housing 350 supported in horizontal position above and transverse to conveyor B. Housing 350 is provided with an inlet port 352 connected by a conduit 354 to a reservoir 356 and an outlet port 358. A sleeve 360 is positioned in housing 350, sleeve 360 having ports 362, 364 in registry with inlet port 352 and outlet port 358, respectively. As shown in FIG. 21, sleeve 360 extends the full length of housing 350 and is mounted in fixed position in the housing.

A plurality of cylinders 370, 372, 374 are mounted for rotation in sleeve 360, the cylinders being stacked one on the other in sleeve 360, the open end of cylinders 370, 372 abutting the closed end of cylinders 372, 374, respectively. Cylinder 370 is connected for rotation in sleeve 360 with cylinder 372 by lugs 376 extending into a recess in the mating end of cylinder 372 and cylinder 372 for rotation with 374 by lug 378 extending into a recess in cylinder 374. A shoulder 380 on the open end of cylinder 374 and a plate 382 affixed by shoulder 384 to the closed end of housing 350, permit rotary movement of the cylinder assembly in sleeve 360 and prevent lateral movement of the cylinder assembly in sleeve 360 and housing 350. Cylinders 370, 372, 374, respectively, are each provided with a port 386, 388, 390, the port on the respective cylinders being in alignment with the ports in housing 350 and sleeve 360. As cylinders 370, 372, 374 are rotated, as an assembly, in housing 350 and sleeve 360, the ports in the respective cylinders are rotated into registry with the inlet and outlet ports of housing 350 and sleeve 360, as will be more clearly described hereinafter.

As shown in FIG. 21, to the left of sleeve 360 and the cylinder assembly 370, 372, 374, bearing 392, mounted in housing 350, rotatably supports valve actuator 394 which is keyed to extension 396 of cylinder assembly 374. For purposes more apparent hereinafter, actuator 394 is oscillated in bearing 392. At one end of its oscillation, actuator 394 aligns ports 386, 388, 390 in cylinders 370, 372, 374 with the respective inlet ports in housing 350 and sleeve 360 and, at the other end, with the respective outlet ports in the housing and sleeve.

Pistons 400, 402, 404 are mounted in cylinders 370, 372, 374, respectively, for movement in unison axially of the cylinder assembly, connecting rod 406 passing through the end of cylinder 374, interconnects pistons 402, 404, and connecting rod 408 passing through the end of cylinder 372 interconnects pistons 400, 402. Rod 410 connected at one of its ends to piston 400 passes through the end of cylinder 370 and plate 382, guiding the assembled pistons as they are reciprocated in the cylinder assembly. Connecting rod 412 is connected at one of its ends to piston 404 and, at its opposite end, to actuating rod 414 mounted for reciprocal movement in bearing 416 mounted in valve actuator 394.

Referring now to FIGS. 20, 25, 26 and 27, the garnished gravy dispenser is driven through a gear box, designated generally 450, by a pulley 452 keyed to shaft 454, pulley 452 being driven by chain 456 from drive shaft E (FIGS. 1 and 2). Shaft 454 is journaled in housing 458 of gear box 454. Worm gear 462 and cam 464 are keyed to shaft 454 for rotation therewith. Pinion 466 in driving engagement with gear 462 is keyed to shaft 468 supported in bearings for rotation in housing 458. A sprocket 470 is keyed to the end of shaft 468 in driving engagement with chain 472. Cam track 474 in cam 464 engages cam follower 476 on arm 478 pivoted intermediate its ends at 480 to housing 458. At its opposite end, arm 478 carries a gear segment 482, gear segment 482 engaging gear segment 484 keyed to valve actuator 394. Arm 490 carrying, at one of its ends, a cam follower 492 in engagement in cam track 494 of cam 464 is connected, at its opposite end, by pin 496 to actuating rod 414. Intermediate its ends, arm 490 is provided with a rectilineal slot 498, block 500 pivotally mounted on adjustable arm 502 being positioned in slot 498 and forms an adjustable pivotal mounting for arm 490.

In operation, the garnished gravy dispenser is driven from drive shaft E by sprocket 452 and chain 456 through gear box 450. Sprocket 452 rotates shaft 454 which, in turn, rotates cam 464, worm gear 462, pinion 466 and shaft 468. As it rotates, cam 464, through cam tracks 474, 494, pivots arms 478 and 490, respectively. As arm 478 is pivoted by cam 474, gear segment 482 on arm 478, through gear segment 484, rotates valve actuator 394 which rotates cylinder assembly 370, 372, 374 in housing 350 and sleeve 360. As cylinder assembly 370, 372, 374 is rotated in sleeve 360 and housing 350, valve ports 386, 388, 390 are brought into alignment with inlet port 352 and outlet port 358, the rotation of cylinder assembly 370, 372, 374 being timed to the movement of the assembled pistons 400, 402, 404 so that, as the pistons are moved to the left of FIGS. 20 and 21, ports 386, 388, 390 are aligned with inlet port 352 to admit the garnished gravy into the respective cylinders. As assembled pistons 400, 402, 404 are moved to the right in FIGS. 20 and 21, cylinder assembly 370, 372, 374 is rotated by cam 464 and arm 478 to register ports 386, 388, 390 with outlet port 358. Thus, as the assembled pistons are moved to the left of FIGS. 20 and 21, the respective cylinders are charged through the inlet port with garnished gravy, the garnished gravy being pumped out of the cylinders through the outlet port when the assembled pistons are moved toward the right of FIGS. 20 and 21.

The operation of the garnished gravy dispenser is timed with the movement of conveyor B so that, as lined pans 62 are passed under the dispenser, a metered volume of garnished gravy is fed through outlet port 358 to the lined pans. As the lined pans, with the metered volume of gravy, are conveyed away from the dispenser, outlet port 358 is closed, inlet port 352 is opened and the assembled pistons 400, 402, 404 are moved toward the right (FIGS. 20, 21) to recharge the cylinders with gravy. As the following lined, but empty, pans 62 arrive under the dispenser, the new charge of garnished gravy is dispensed into the pan.

Each operating cycle of the dispenser delivers a metered volume of gravy. So long as a sufficient supply is maintained in the reservoir to charge the cylinder, the volume dispensed during each cycle is constant. Thus, each lined pan receives the same amount of garnished gravy.

Figure 26:
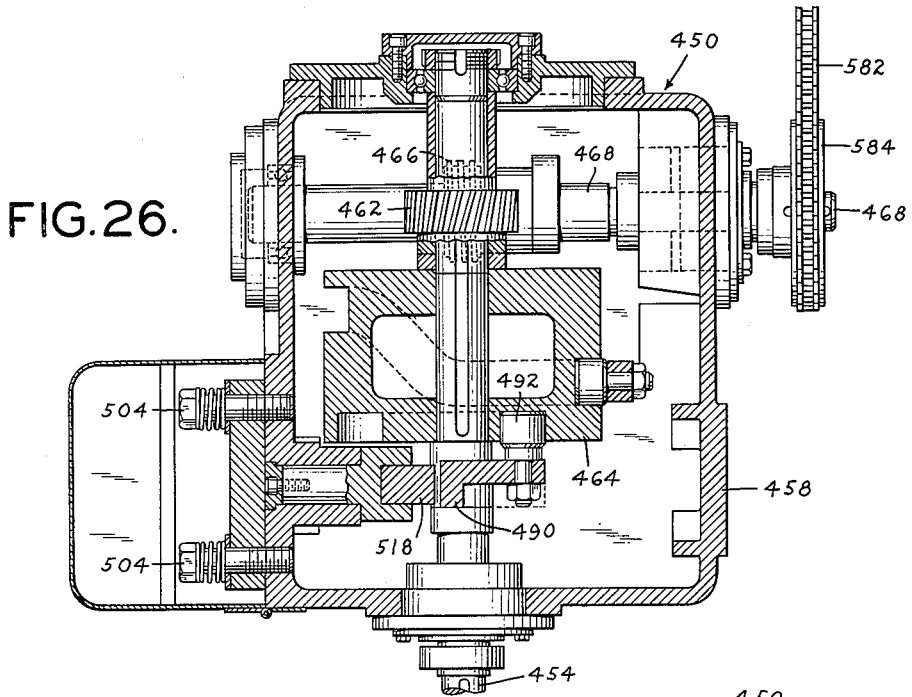
FIG. 26 is a sectional view, taken along line 26—26 of FIG. 25.
Figure 25:
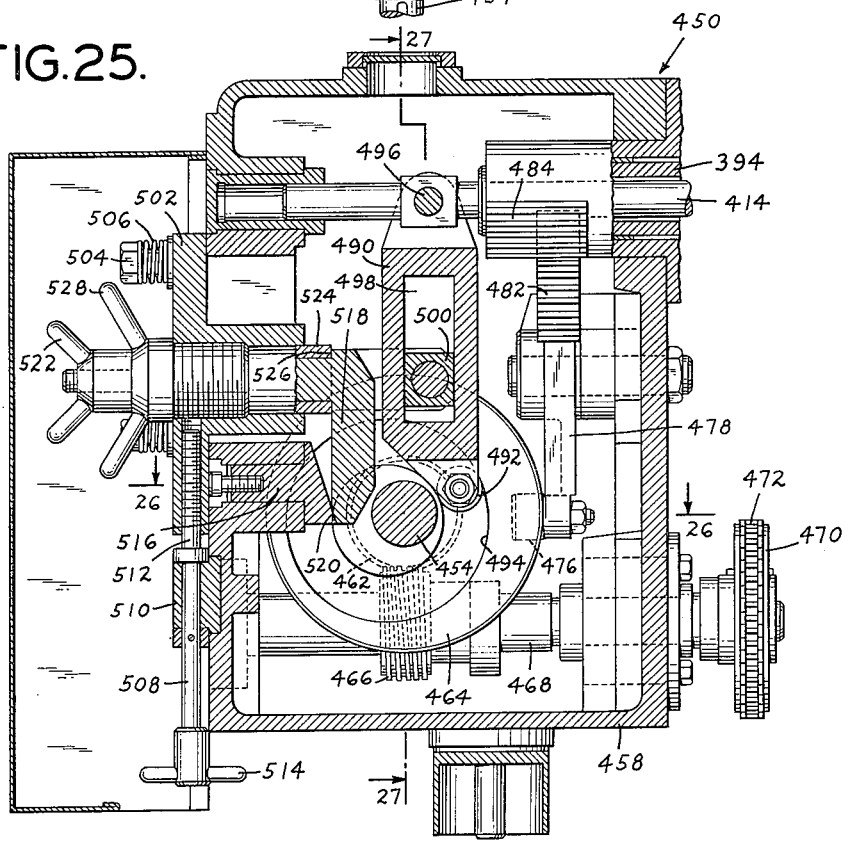
FIG. 25 is a side view, in enlarged detail and partly in section, showing a portion of the garnished gravy dispenser drive.
Figure 29:
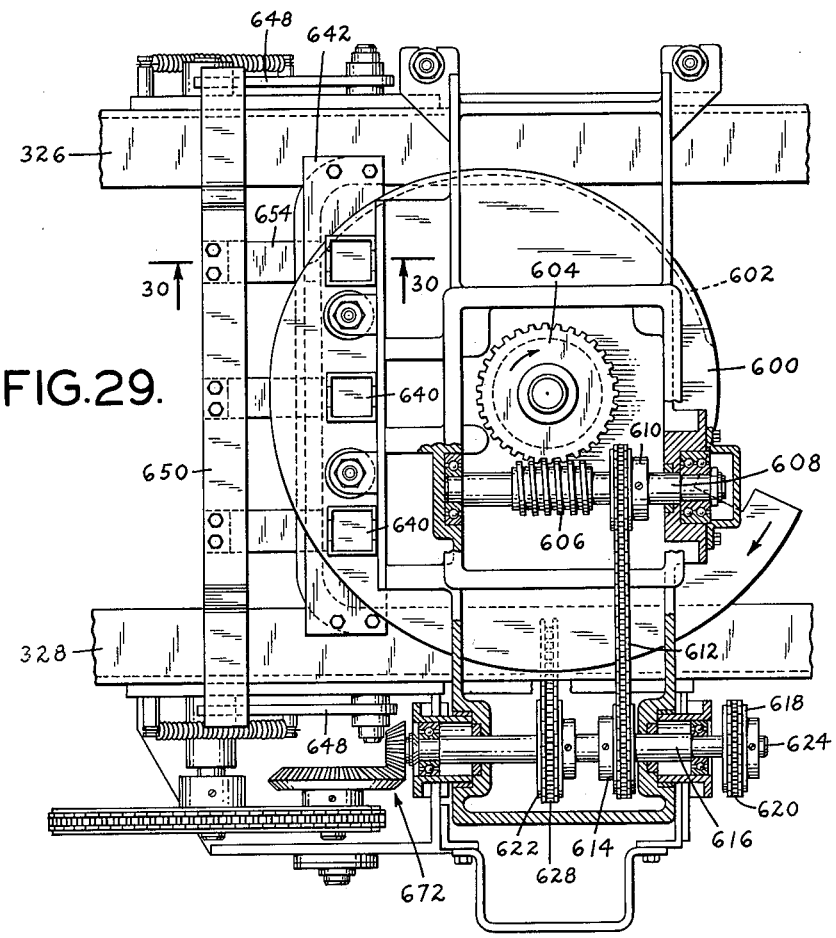
FIG. 29 is a top view, partly in section, of the meat dispenser of FIG. 28.
Figure 30:
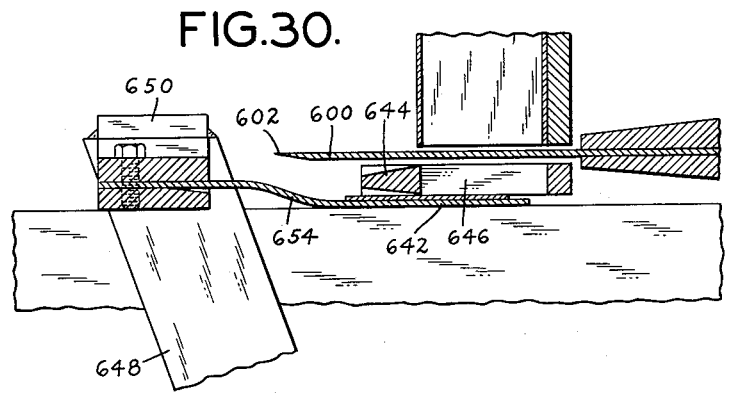
FIG. 30 is an enlarged sectional view, taken along line 30—30 of FIG. 29.
Figure 31:
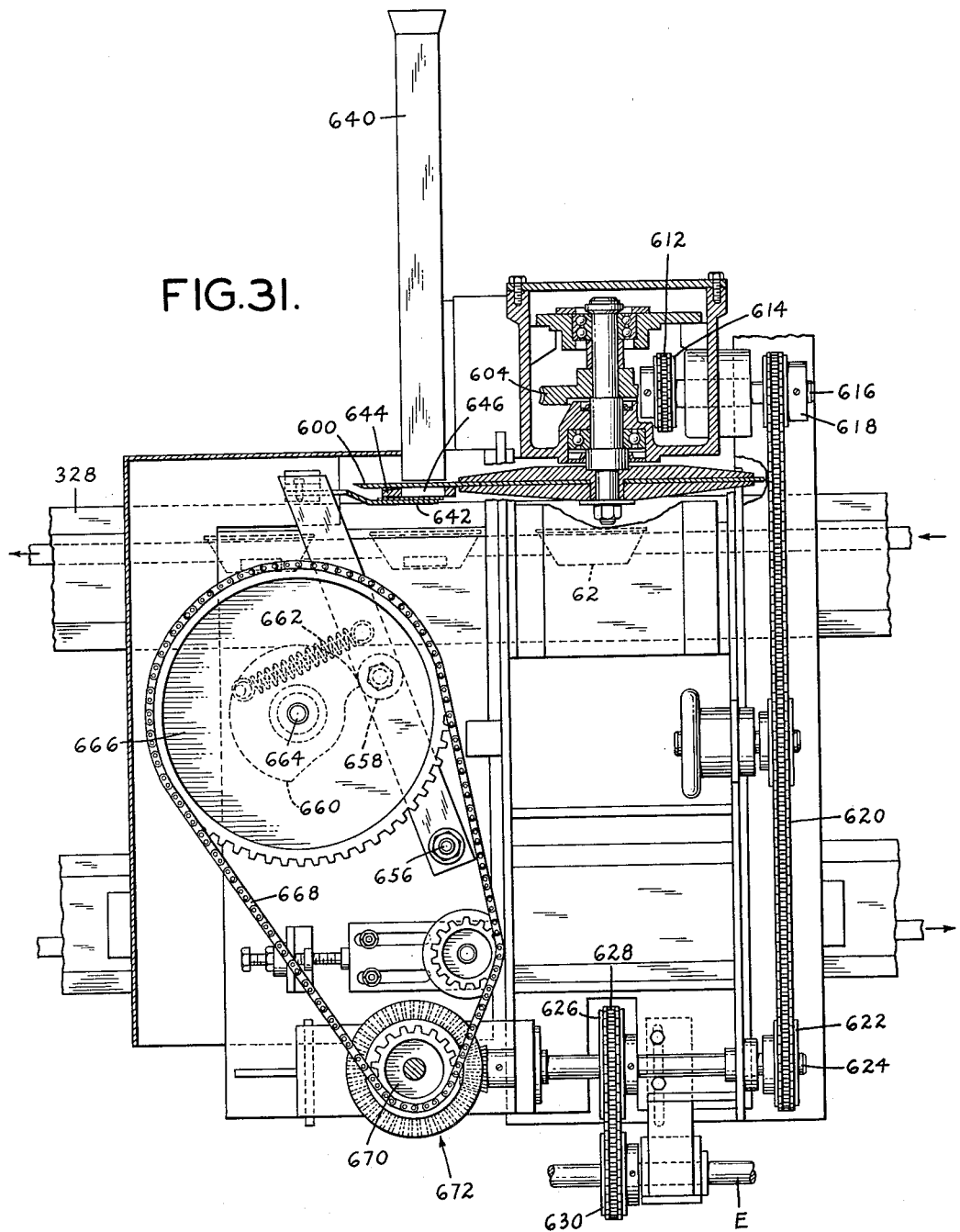
FIG. 31 is an enlarged view, partly in section, of the meat dispenser, taken from the side of the meat dispenser as shown in FIG. 1 and 2 and showing details of the meat dispenser drive arrangement.

While, as described, the garnished gravy dispenser meters and dispenses a constant volume during each operating cycle, when it is desired to fill some other kind of pie on the machine, a different volume of gravy may be required. For versatility and to permit regulation, the garnished gravy dispenser drive is adjustable. As shown in FIGS. 25 and 26, arm 490 is pivoted at slot 498 on block 500 mounted on adjustable arm 502. By adjusting the relative position of block 500 in slot 498, the stroke of arm 490, actuating rod 414 and assembled pistons 370, 372, 374 may be adjusted. Thus, by moving block 500 toward pin 496, the stroke of actuating rod 414 and the piston assembly is shortened, and by moving block 500 toward cam 464, the stroke is lengthened. However, in addition to shortening or lengthening the stroke of the piston, to assure that a constant volume of garnished gravy will be dispensed on each operating cycle of the dispenser, as the stroke of the piston is adjusted it is also necessary to reposition the piston with respect to the cylinder so that, at the end of its inward movement in the cylinder, the piston will be adjacent the end of the cylinder. Thus a two-way adjustment of block 500 is provided.

Referring now to FIG. 25, a plate 502 is mounted for adjustment over an opening in the side of housing 458 by bolts 504, plate 502 being urged into engagement with the side of housing 458 by springs 506 carried on bolts 504. A rod 508, rotatably mounted in boss 510 fixed to housing 458, is threaded at 512 to plate 502, rotation of rod 508 by handle 514 adjusting the relative position of plate 502 on housing 458. A wedge 516 is fixed to housing 458 adjacent plate 502. Adjustable arm 518 extends downward and, at 520, engages wedge 516. At its outer end, adjustable arm 518 is threaded to a wing-nut 522.

A stop 524 is threaded in plate 502 and, at its inner end engages a shoulder 526 on adjustable arm 518, stop 524 being adjusted in plate 502 by wings 528 fixed to the outer end of stop 524.

To adjust the position of block 500, wing-nut 522 and stop 524 are loosened and rod 508 is turned changing the relative position of plate 502 on housing 458 and repositioning block 500 in slot 498 of arm 490. With block 500 repositioned, wing-nut 522 is tightened to bring the extension of adjustable arm 518 into contact with wedge 516 at 520. When adjustable arm 518 is in contact with wedge 516, stop 524 is tightened to bring the inner end of stop 524 into engagement with shoulder 526 on adjustable arm 518. Repositioning of block 500 in slot 498 in this manner adjusts the stroke as well as the position of the assembled pistons in the cylinder assembly.

Pallets 300, with lined pans 62, are moved by conveyor B at a uniform, constant speed. To permit the garnished gravy to be fed into the lined pans without spilling or splashing, movable nozzles, designated generally 550, 552, 554 are connected to the outlet ports 358 of housing 350. As shown in FIGS. 21 and 24, nozzles 550, 552, 554 are interconnected by a bar 556, which, as will be pointed out in more detail hereinafter, interconnects the nozzles for unitary movement and, at the same time, connects the nozzles to an actuator which moves the discharge end of the nozzles in an elliptical path into and out of the lined pans as they are moved by conveyor B. As will be more apparent hereinafter, the elliptical path of travel of the nozzles permits the nozzles to move forward with lined pans 62, as the pans move along conveyor B.

Figure 20:
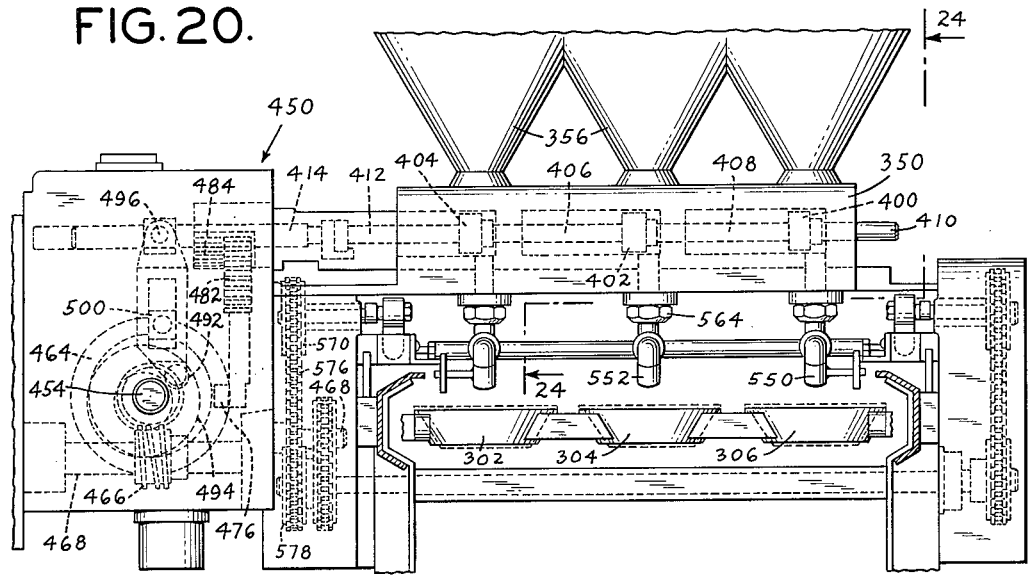
FIG. 20 is a side view, in enlarged detail, showing the garnished gravy dispenser of FIG. 1.
Figure 27:
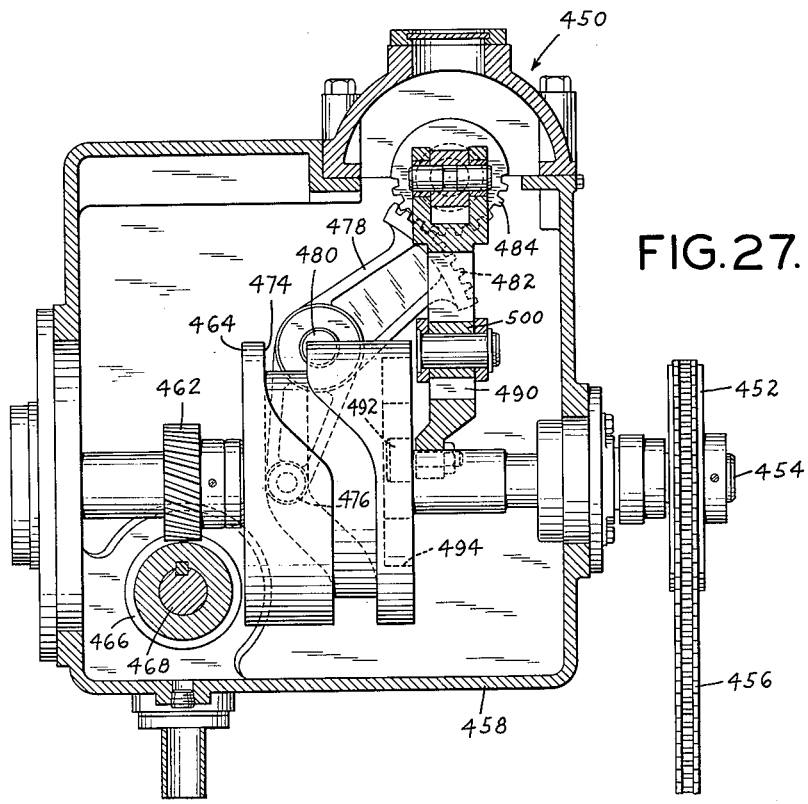
FIG. 27 is a sectional view, taken along line 27—27 of FIG. 25.

As best shown in FIGS. 21 and 24, each nozzle 550, 552, 554 includes telescoping tubes 560, 562, tube 562 being connected to outlet port 358 of housing 350 by a ball and socket connection generally designated 564. Nozzle operating rod 566 is connected at one of its ends by pin 568 to sprocket 570 and, at its opposite end, is slidably supported in pin 572 rotatably supported by support 573 fixed to housing 350. Intermediate its ends at 575, rod 566 is connected to bar 556. A chain 576 is in driving engagement with sprocket 570 and sprocket 578 keyed to shaft 579. Sprocket 580, also keyed to shaft 579, is driven by chain 582 and sprocket 584 keyed to shaft 468. A similar nozzle operating rod is driven by a similar sprocket drive from an extension of shaft 579 (FIG. 20).

The elliptical movement of nozzles 550, 552, 554, is timed to the movement of lined pans 62 along conveyor B, the operation of sleeve 360 and ports 386, 388, 390 and the movement of assembled pistons 400, 402, 404, so that, as the lined pans 62 are moved by conveyor B under the dispenser and the garnished gravy is dispensed, nozzles 550, 552, 554 move downwardly into the pans and forwardly in the direction of pan movement. The nozzles are then moved upwardly away from the pans and, in their upward position, returned in a direction opposite to pan movement. The garnished gravy is dispensed during the forward movement of the nozzles.

After lined pans 62 have received the garnished gravy, conveyor B moves the pans to the meat dispenser where the meat, in measured quantity, is added to each pan. In the illustrated embodiment of the invention a single meat dispenser is employed, each pie receiving a measured portion of meat from the dispenser. It is to be understood, where the over-all volume of meat to be added to the pie is great, additional meat dispensers, arranged in alignment along the conveyor, might be employed.

Referring now to FIGS. 1, 2, 28, 29 and 31, the meat dispenser includes a knife 600, having a cutting edge 602, mounted for rotation in a horizontal plane above conveyor B by a gear 604 driven by pinion 606 keyed to shaft 608. A sprocket 610, driven by a chain 612, is also keyed to shaft 608. Chain 612 is driven by sprocket 614 keyed to shaft 616. Shaft 616 is driven by sprocket 618 and chain 620, which, in turn, are driven from drive shaft E by sprocket 622, shaft 624, pulley 626, chain 628 and pulley 630 keyed to drive shaft E.

Magazines 640, each adapted to receive a preformed column of meat, are mounted above knife 600. A movable plate 642 is mounted below knife 600, a stationary plate 644 having opening 646 beneath each of the magazines 640, being mounted in fixed position intermediate the lower end of magazines 640 and knife 600. Plate 642 is mounted for movement radially of knife 600 by arms 648 connected at one of its ends to plate 642 by a cross-head 650 and extensions 654. At their opposite ends, arms 648 are pivotally connected by pins 656 to the conveyor frame. Intermediate the ends of arms 648 are attached cam followers 658 held in engagement with cam 660 by spring 662 attached, at one of its ends, to arm 648 intermediate cam follower 658 and cross-head 650 and, at its opposite end fixed to the conveyor frame. Cams 660 are keyed to shaft 664, driven from drive shaft E and shaft 624 by sprocket 666, chain 668, sprocket 670 and gear assembly, generally designated 672.

In operation, knife 600 is rotated continuously and is timed with the operation of conveyor B and the balance of the machine so that, as the lined and garnish filled pans 62 are fed by conveyor B beneath magazines 640, a sliced portion or cube of meat is fed from the meat dispenser into the pan.

As best shown in FIG. 24, knife 600 has a spiral or snail shaped edge, the radius of the edge increasing from a narrow radius to a wide radius as the knife is rotated under the magazines. As the area of smaller radius passes under magazines 640, the column of meat in magazines 640 drops down through openings 646 in plate 644 onto plate 642. As the radius of the turning knife increases, the edge of the knife passes through the lower end of the column of meat slicing off the cube of meat located in opening 646, knife 600 supporting the column in magazine 640 above the knife. The rotation of knife 600 is timed with conveyor B so that the column of meat is cut and a cut section or cube of meat is in opening 646 of plate 644 before pan 62 arrives in position at the meat dispenser. Cam 666 is timed to the rotation of knife 600 and the movement of pans 62 in such a manner that cam follower 658 is in engagement with the high portion of the cam, cam 666 holding plate 642 under opening 646 against the tension of spring 662.

With a cut section or cube of meat in opening 646 and the column of meat in magazine 640 supported on knife 600, pan 62 on conveyor B is moving toward the meat dispenser. As pan 62 moves under magazine 640, plate 644 and opening 646, the step of cam 666, which is rotating in a counterclockwise direction as viewed in FIG. 31, clears cam follower 658, tensioned spring 662 snaps plate 642 to the left, clearing the bottom of opening 646 in plate 644, and drops the cube of meat in opening 646 into lined and garnish filled pan 62.

As cam 666 continues its rotation in the counterclockwise direction, cam follower 658, following the profile of the cam, moves plate 642 to the right, reclosing the bottom of opening 646 and re-tensioning spring 662. With the bottom of opening 646 closed, the area of smaller radius of knife 600 again passes under magazine 640 dropping the column of meat in magazine 640 down into opening 646. The cycle of operation is repeated as each garnish filled, lined pan 62 passes under magazine 640.

From the meat dispenser, conveyor B moves pan 62, which now contains the meat, the garnished gravy and dough liner, through the lid maker. At the lid maker a dough cover or lid, which has been preformed in the lid maker, is positioned over the top of pan 62 as the pan moves through the lid maker.

Referring now to FIGS. 32, 33, 34 and 39, the lid maker includes a support 700 mounted over conveyor B. A dough dispenser, generally designated 702, is mounted at the top of support 700. Dough dispenser 702 is identical to the dough dispenser on table A, with the exception of the size of dough biscuit dispensed. The dough biscuit or dough slug dispensed by dough dispenser 702 is of a size so that, when subsequently formed, the volume of dough is sufficient to form a cover or lid over the dough lined and filled pan 62 without leaving dough extending beyond the edge of the pan when the cover or lid is in place on the pan.

Figure 32:
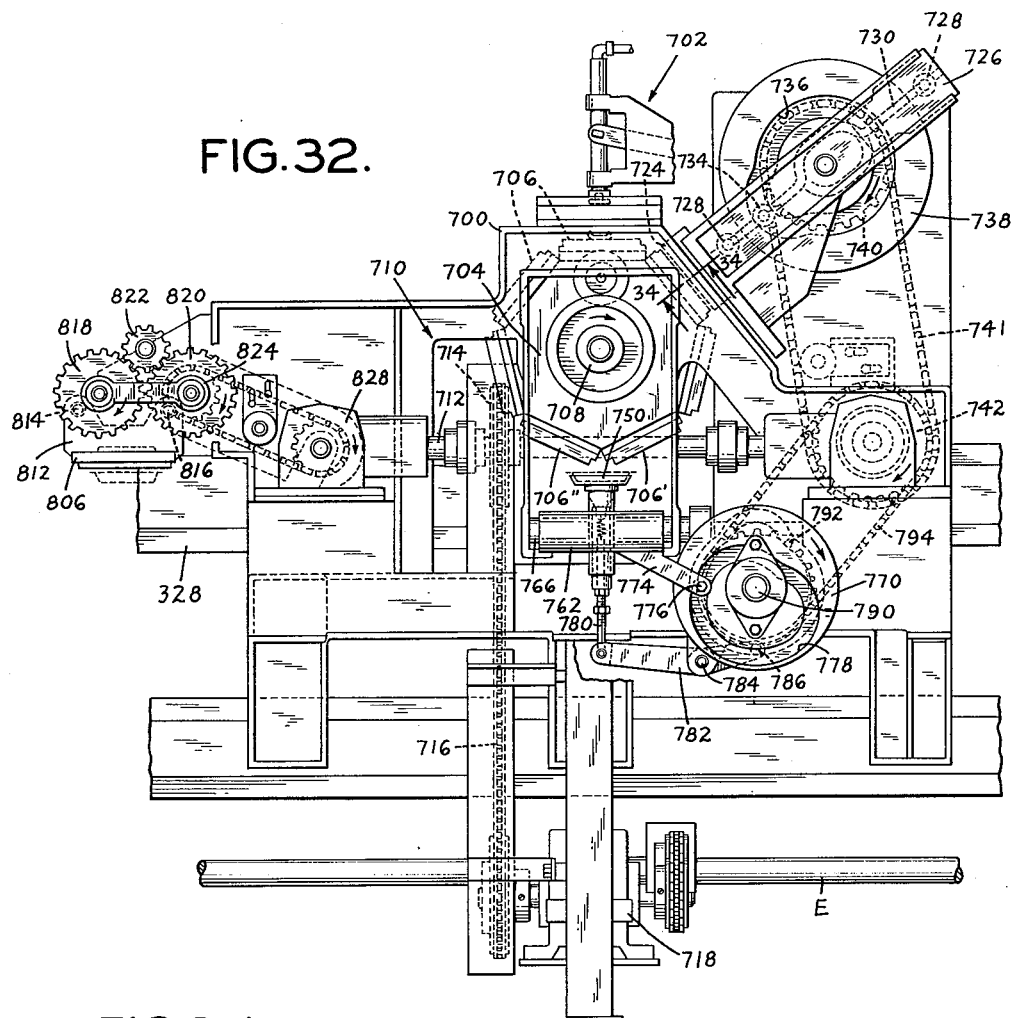
FIG. 32 is an enlarged view of the lid maker and affixer taken from the side as shown in FIGS. 1 and 2 and showing certain of the details of the drive arrangement.
Figure 34:
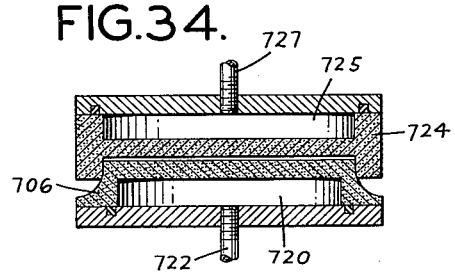
FIG. 34 is an enlarged view, in section, of the lid forming dies and die housings.

A forming head 704, having a plurality of male forming dies or plates 706 of porous material spaced equidistantly around the forming head, is mounted for rotation on support 700 in the direction of the arrow in FIG. 32. Forming head 704 is connected to output shaft 708 (FIG. 33) of an intermittent indexing drive mechanism, generally indicated 710. Input shaft 712 of indexing drive 710 is connected to drive shaft E by sprocket 714, chain 716, through gear box, generally designated 718, and the drive associated therewith. Any conventional indexing drive mechanism which will provide an intermittent drive at the output shaft when the input shaft is driven continuously may be employed for driving forming head 704. For example, a Ferguson drive as hereinbefore described may be employed for this purpose. As best shown in FIG. 34, each of the porous metal forming dies or plates 706 has a cavity 720 connected by conduit 722 to an air pressure source, not shown.

Female forming die 724 is mounted on one end of an actuator 726 slidably supported by rollers 728 in groove 730 of a housing 732 fixed to support 700. A cam follower 734 is mounted on actuator 726, cam follower 734 being positioned in cam track 736 on cam 738. Cam 738 is connected by sprocket 740 and chain 741 to gear box 742, driven, by chain 716, from drive shaft E. The lid maker is driven in timed sequence with conveyor B so that, as conveyor B passes pans 62 through the lid maker, a preformed lid is positioned over the top of the pan. Female die 724 (FIG. 34) has, at its inner side, a cavity 725 connected by conduit 727 to an air supply source, not shown.

In operation, forming head 704 of the lid former is driven intermittently in the direction of the arrow in FIG. 32, and dough dispenser 702 and forming die 724 are driven continuously, all from drive shaft E. A male forming die or plate 706 on head 704 is brought into position under dough dispenser 702 and held in locked position under the dough dispenser by intermittent drive 710.

The drive of forming head 704, dough dispenser 702 and forming die actuator 726 are timed so that, with the forming head in locked position, the plunger of dough dispenser 702 delivers a dough slug or biscuit to porous metal plate 706 in locked position under the dough dispenser and actuator 724 moves female forming die 724 into mating engagement with porous metal plate 706 in locked position at the forming station. Thus, intermittent drive mechanism 710 rotates head 704 to bring plate 706 under dough dispenser 702 and locks holding plate 706 in position. With plate 706 in locked position, the plunger of dough dispenser 702 moves toward plate 706 depositing a slug or biscuit of dough on the plate and the plunger moves outward. As the plunger moves outward, drive mechanism 710 unlocks head 704 and rotates the head into position at the lid forming station and again locks the head in position. Actuator 726 moves die 724 toward head 704 and into mating engagement with die 706. As die 724 moves into mating engagement with die 706, the dough biscuit on die 706 is pressed outwardly along the faces of the dies filling the clearance between the dies. The volume of dough deposited on die 706 and the clearance between dies 706, 724 is selected so that the clearance between the dies is filled without the dough extending beyond the dies. When deposited on and fixed to pan 62, as will be later described, the formed dough lid covers the pie without extending beyond the edge or lip of the pan.

As described, the porous metal plunger head of dough dispenser 702 and porous metal die 724 are each connected to an air supply. Thus, as air is delivered to the plunger head and die, air flow occurs through the head and die. The air supply can be continuous or intermittent. In either event, the air supply is connected to the plunger head and the die at the time the head and die move away from the forming head to provide air flow through the plunger head and die, respectively. Hence, as the plunger head and die are moved away from the forming head, the dough is parted, leaving the dough in place on forming die or plate 706.

From the lid forming station, forming die 724, which now is covered by a thinly pressed dough disc, is moved stepwise in a clockwise direction as shown in FIG. 32. As die or plate 706 rotates through its lowermost position on head 704, that is, from the position designated 706′ to the position designated 706″ on FIG. 32, the dough disc is brought into registry with the top of pan 62 and is transferred from plate 706 to pan 62. As this transfer is made, head 704 and plate 706 are rotating and conveyor B, which is operated continuously, is moving pan 62 through the lid former.

Referring now to FIGS. 35 through 38, as well as FIG. 32, pan 62 is lifted out of pallet 300 into registry with plate 706 and forming head 704. A pan elevator 750, formed to receive the bottom of pan 62, is pivotally connected at 752 to carrier 754, slidably mounted in guide 756. A downwardly extending extension 758 of pan elevator 750 is connected, at its lower end to one end of spring 760, the opposite end of spring 760 being connected to carrier 754. Spring 760 holds pan elevator 750 in a position substantially parallel to the bottom of pan 62 resting in pallet 300 and permits the pan and pan elevator to be tipped or tilted around pivot 752 as the pan contacts the forming head and registers therewith.

Figure 33:
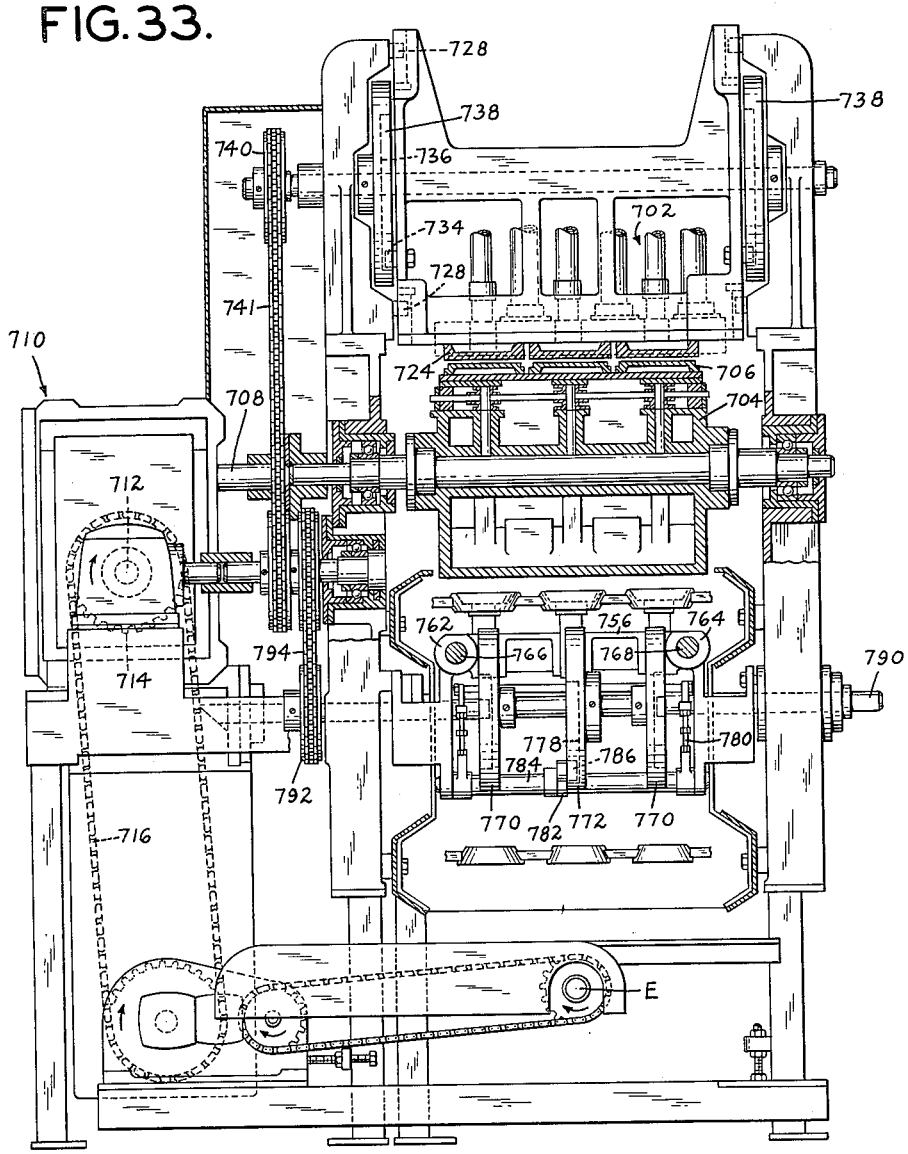
FIG. 33 is an enlarged side elevational view, partly in section, of the apparatus of FIG. 32.

As best shown in FIGS. 32, 33, three pan elevators 750 are provided, one for each of the three streams of pies formed and fed through the machine. At its opposite ends guide 756 is provided with bosses 762, 764 slidably mounted on bosses 766, 768 connected to support 700. Thus, pan elevator 750 is movable upward through pallet 300 on conveyor B by the slidable mounting of carrier 754 in guide 756 and is movable with pallet 300 and conveyor B by the movement of guide 756 on bosses 766, 768.

The lifting of pans 62 by pan elevator 750 and the movement of guide 756 and the pan elevators with conveyor B are timed to the rotation of forming head 704 and the movement of conveyor B by cams 770 and 772, the former moving guide 756 and pan elevators 750 with conveyor B and the latter elevating the pan elevators.

As best shown in FIG. 32, guide 756 has an extension 774 carrying at its end, a cam follower 776 positioned in cam track 778 of cam 770. Carriers 754, at their lower end, are connected, by an adjustable link 780, to one end of arm 782. Arm 782 is pivoted, intermediate its end, by pin 784 carried in support 700, and, at its opposite end, carries a cam follower 786 positioned in cam track 788 of cam 772. Cams 770, 772 are keyed to shaft 790, driven, from gear box 742, by pulley 792 and chain 794.

Forming head 704, conveyor B and pallet 300 are moving from the right to the left, as viewed in FIGS. 35, 36, 37 and 38. As the leading edge of plate 706 approaches the leading edge of pan 62, pan elevator 750 is moved upwardly by cam 772 raising pan 62 out of pallet 300 and bringing the leading edge of pan 62 into contact with the leading edge of plate 706. Head 704 continues its rotation in a clockwise direction. Plate 706 moves toward pallet 300 and pan 62 and pan elevator continues to lift pan 62 upwardly. With the leading edges in contact and head 704 and pan 62 moving toward each other, pan elevator 750 pivots at 752 bringing the edge around pan 62 into full contact circumferentially around plate 706. While cam 772 lifts pan elevator 750, cam 700, through guide 756, moves the pan elevators forward at a speed equal to the movement of plate 706 in the direction of travel of pallet 300 and conveyor B.

The upward travel of pan 62 and pan elevator 750 and the downward rotation of head 704 are adjusted so that the edge of the dough liner in pan 62 and the marginal edge of the dough on plate 706, which forms the pie lid, are brought into contact without substantial pressing of the marginal edges of the dough cover or lid into the edge of the liner.

During the travel of head 704 from the dough dispenser, until the dough lid is deposited on pan 62, the dough is positioned on porous metal die or plate 706. Thus, from the time the dough disc is initially positioned on the plate 706 until the lid is in position on pan 62, there is no air delivered by conduit 722 to cavity 720, nor is there any substantial flow of air through plate 706. With plate 706 in registry with pan 62 and before plate 706 is moved away from the pan, air is fed through conduit 722 to plate 706, the flow of air through plate 706 parting the dough lid from die 706 and leaving the lid, in place, on the filled pie.

Figure 39:
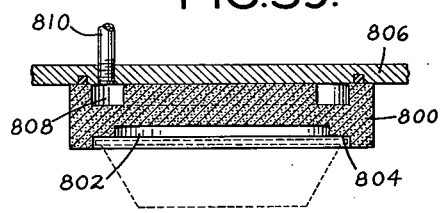
FIG. 39 is an enlarged view, in section, of the lid crimping head.

With the dough lid in place on the lined and filled pan 62, pan 62 is moved by pallet 300 and conveyor B to the lid crimper. As best shown in FIGS. 32 and 39, the lid crimper includes a porous metal disc 800 having, in its face, a recess 802 surrounded by a step portion 804. Disc 800 is fixed to a place 806. At its face adjoining plate 806, porous metal disc 800 is provided with a recess 808 which, with plate 806, forms a cavity extending circularly in the back of disc 800 opposite step 804. Recess 808 is connected by conduit 810 to an air supply source, not shown.

With particular reference to FIG. 32, plate 806 is connected by support 812 at pivots 814, 816 to gears 818, 820, respectively. Gears 818, 820 are interconnected by gear 822 and by sprocket 824, chain 826, through gear box 828 and chain 716 to drive shaft E.

Gears 818, 820 are timed to the operation of conveyor B and the feed of pallets 300 so that, as a pallet 300 is fed through the lid crimper, disc 800 is brought downward into contact with the lined, filled and covered pan 62. The downward movement of disc 800 by gears 818, 820 is preset so that step 804 is brought into contact with the marginal edge of the dough lid and the pan liner, squeezing the overlapping dough at the marginal edge of the dough lid and the edge of the pan filled lining together to form a dough seal around the pie. This seal holds the ingredients in the pie. If desired, and in order to form a ready identification for the pie, a marking device may be provided in disc 800 to mark the lid during the crimping operation. For example, with a meat pie it might be desirable to perforate the top of the pie with a letter "M." Thus, pins would be positioned in disc 800 to perforate the letter "M" on the top of the pie. Obviously, other markings would be employed for other types of pies.

After step 804 on disc 800 has been brought into contact with pan 62 and has pressed the marginal edge of the dough lid and the edge of the dough liner to form a seal around the pie, disc 800 is moved upwardly by gears 818, 820, away from pan 62. At the time porous metal disc 800 is moved upwardly away from pan 62, air is fed to cavity 808, flowing through porous metal disc 800 and parting pan 62 from disc 800. Air may be fed to cavity 808 by conduit 810 continuously or the air may be supplied only during that portion of the travel of disc 800 when the disc is moved away from pan 62. In either event, pan 62 remains in pallet 300 when disc 800 is moved upwardly.

Figure 19:
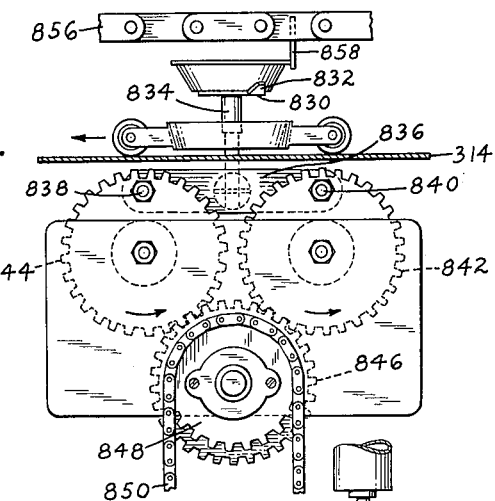
FIG. 19 is a side view, taken along line 19—19 of FIG. 17, showing a portion of the pan transfer drive.
Figure 9:
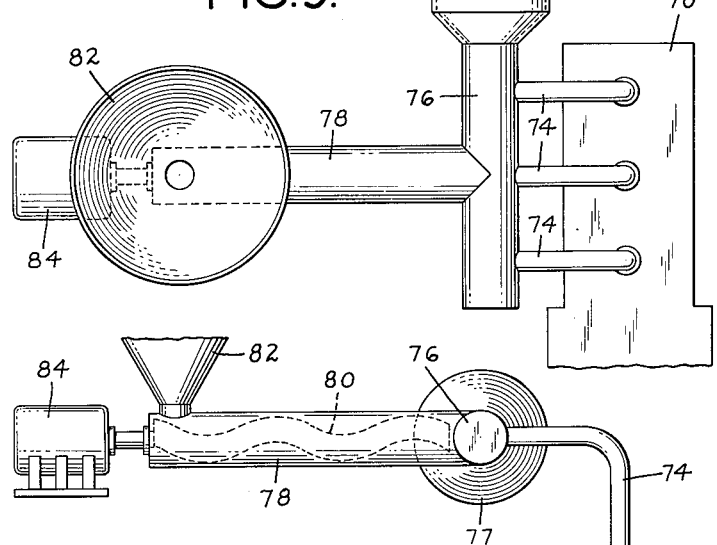
FIG. 9 is a top plan view, in enlarged detail, showing the dough feed apparatus for the dough dispenser of FIG. 1.
Figure 10:
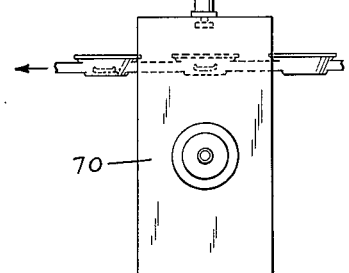
FIG. 10 is a side elevational view, in enlarged detail, of the apparatus of FIG. 9.
Figure 11:
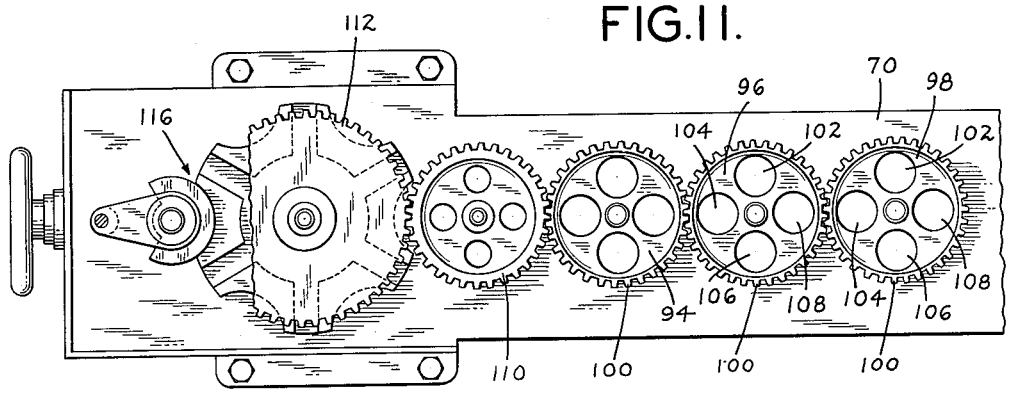
FIG. 11 is a top plan view showing the drive for that portion of the dough dispenser apparatus shown in FIG. 8.

From the lid crimper, conveyor B moves pan 62 to the end of the conveyor where the pan, containing a filled, covered and crimped pie, is elevated out of pallet 300 by the pan elevator. Referring to FIGS. 16, 17 and 19, the pan elevator includes a plate 830, having lugs 832. Arm 834 is connected at one of its ends to plate 830 and at its other end to bar 836. At its opposite ends, bar 836 is connected at 838, 840 to gears 842, 844 respectively. Gears 842, 844 are driven by gear 846 connected by sprocket 848 and chain 850 to drive shaft E.

Plates 830 are positioned and timed with conveyor B to pass through the openings in pallet 300 and lift pans 62 out of pallet 300. Tracks 852, 854 are positioned above conveyor B with the end of the track adjacent to plates 830 when the plates are in their elevated position above pallet 300. A chain 856 having lugs 858 is mounted intermediate tracks 852, 854.

In operation, the pan elevator is timed with conveyor B so that as pallet 300 arrives at the pan elevator position, gears 842, 844, 846, through sprocket 848 and chain 850 elevate plates 830 through the openings in pallet 300, lifting the filled and covered pie pans 62 out of pallet 300 and elevate the pans to a position where the opposite edges of the pan are above and adjacent to the edges of tracks 852, 854. With the pie in elevated position adjacent the edges of the tracks, chain 856 and lugs 858 push the pie off plate 830 onto the track and away from conveyor B.

Gears 842, 844, 846 withdraw plate 830 downward and back through the openings in pallet 300, conveyor B moving empty pallet 300 away from the pan elevator and to the bottom of the conveyor where empty pallet 300 is conveyed back to the opposite end of the conveyor and brought back into position on the top of the conveyor to receive lined pans 62 from table A.

As aforestated, the entire machine is operated continuously, the various units being timed with the other units so that each operation is performed at the proper interval. Table A, through an intermittent drive from drive shaft E, is driven in an intermittent timed sequence, the pan dispenser, dough dispenser, cup former and pan transfer which are associated with table A are driven continuously but in timed relationship with table A. Conveyor B, and the various units associated therewith, are driven continuously, the drive of conveyor B and the various units associated with conveyor B being timed with table A.

The entire operation of the machine is automatic. The pastry dough and the various materials of the pie filling are dispensed automatically and in metered amounts to form the pie. Both in forming the pan lining and the lid, a measured amount of dough is metered and formed in such manner that only that quantity of dough necessary to form the liner and lid, respectively, is dispensed at each operation. Thus, trimming and reworking of excess dough is avoided.

Dough forming and dispensing is performed on porous material, air, under pressure, being admitted to the opposite sides of the porous material to cause the dough to be parted from the surface of the porous material. One porous material which has been found to be satisfactory for this purpose is powdered and sintered stainless steel. Such material, when sintered under pressure, has been found to have sufficient strength to withstand the forces in forming and pressing and, at the same time, to have sufficiently porosity to allow air to be employed to part the dough from the porous surface. In this manner the dough is formed and shaped without resorting to raw flour or other parting materials. Since parting materials are not required and the dough is not reworked, the pastry is of uniform quality.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A machine for lining and filling pie pans comprising conveying means for receiving and moving a pie pan along a predetermined path, pan dispensing means, means on said pan dispensing means for receiving and supporting a plurality of nested pie pans in a substantially vertical column above said conveying means, means for separating and releasing individual pie pans from the bottom of said vertical column and for discharging said individual pans onto said conveyor, a dough dispenser, a reservoir on said dough dispenser, a dough metering chamber on said dough dispenser, means for feeding dough from said reservoir to said dough metering chamber, means for removing dough from said dough metering chamber and for depositing said dough in a pie pan moved by said conveyor along said predetermined path, a cup former, means on said cup former movable into engagement with a pie pan moved by said conveyor along said predetermined path for pressing said dough deposited in said pan into a pan liner, a garnished gravy dispenser, a reservoir on said garnished gravy dispenser, metering means on said gravy dispenser for metering and delivering metered quantities of gravy from said reservoir to a lined pie pan as said lined pie pan is moved by said conveyor along said predetermined path, a meat dispenser, means on said meat dispenser for receiving and supporting a column of meat in a substantially vertical position above said conveyor, means for measuring and severing portions of meat from said column and for discharging said measured and severed portions into said lined pan as said lined pan is moved by said conveyor along said predetermined path, a lid former, a reservoir on said lid former, a dough metering chamber on said lid former, means for feeding dough from said lid former reservoir to said dough metering chamber on said lid former, a first lid forming die on said lid former, means for removing dough from said dough metering chamber on said lid former and for depositing said dough on said first lid forming die, a second lid forming die on said lid former, means for moving said second die into mating engagement with said first die to form said dough on said first die into a lid, means for moving said first die and said lid into mating engagement with a lined pan moving along said predetermined path, means for removing said formed lid from said first die and for depositing said lid on said lined pan as said lid and said lined pan are in substantial mating engagement, a dough crimper, and means for moving said dough crimper into engagement with the lid on a lined pan as said pan is moved along said predetermined path.

2. In a machine as recited in claim 1 in which said means for removing dough from said dough metering chamber and for depositing said dough in a pan moved by said conveyor along said predetermined path includes a plunger, a head of porous metal fixed to one end of said plunger, means for moving said plunger through said dough metering chamber and for engaging said head of porous metal with the dough in said metering chamber to remove said dough from said chamber and to deposit said dough in a pan moved by said conveyor along said predetermined path, and means for discharging air through said porous metal head to release said dough from said porous metal head when said dough is in said pan.

3. In a machine as recited in claim 1 in which said means on said cup former movable into engagement with a pie pan moved by said conveyor along said predetermined path for pressing said dough deposited in said pan into a pan liner includes a forming die of porous metal, means for moving said forming die into and out of a pie pan on said conveyor, and means for discharging air through said porous metal forming die to release said dough from said forming die after said dough has been formed into a liner in said pan.

4. In a machine as recited in claim 1 in which said first lid forming die and said second lid forming die are of porous metal, means for moving said second lid forming die into and out of engagement with said first die, means for discharging air through said second die as said second die is moved out of engagement with said first die to release said dough from said second die, and means for discharging air through said first die when said first die is in mating engagement with a lined pan to release said dough from said first die.

5. A machine for lining and filling pie pans comprising conveying means for receiving and moving a pie pan along a predetermined path, means for driving said conveyor, pan dispensing means on said conveyor, means on said pan dispensing means for receiving and supporting a plurality of nested pie pans in a substantially vertical column above said conveying means, means for separating and releasing individual pie pans from the bottom of said vertical column and for discharging said individual pans onto said conveyor, a dough dispenser on said conveyor, a reservoir on said dough dispenser, a dough metering chamber on said dough dispenser, means for feeding dough from said reservoir to said dough metering chamber, a plunger on said dough dispenser, a head fixed to one end of said plunger, means for reciprocating said plunger through said dough metering chamber and for engaging said head with the dough in said metering chamber to remove said dough from said chamber and to deposit said dough in a pan moved by said conveyor along said predetermined path, a cup former on said conveyor, a liner forming die on said cup former, means for moving said liner former die into and out of engagement with a pie pan moved by said conveyor along said predetermined path, a gravy dispenser, a reservoir on said gravy dispenser, metering means on said gravy dispenser for metering and delivering metered quantities of gravy from said reservoir to a lined pie pan as said lined pie pan is moved by said conveyor along said predetermined path, a meat dispenser, means on said meat dispenser for receiving and supporting a column of meat in a substantially vertical column above said conveyor, means for measuring and severing portions of meat from said column and for discharging said measured and severed portions into said lined pan as said lined pan is moved by said conveyor along said predetermined path, a lid former, a reservoir on said lid former, a dough metering chamber on said lid former, means for feeding dough from said lid former reservoir to said dough metering chamber on said lid former, a first lid forming die on said lid former, means for removing dough from said dough metering chamber on said lid former and for depositing said dough on said first lid forming die, a second lid forming die on said lid former, means for moving said second die into mating engagement with said first die to form said dough on said first die into a lid, means for moving said first die and said lid into mating engagement with a lined pan moving along said predetermined path, means for removing said formed lid from said first die and for depositing said lid on said lined pie as said lid and said lined pan are in substantial mating engagement, a dough crimper, means for moving said dough crimper into and out of engagement with the lid on a lined pan as said pan is moved along said predetermined path, and driving means connecting said pan dispensing means, said dough dispenser, said cup former, said gravy dispenser, said meat dispenser, said lid former and said dough crimper with said conveyor driving means for timed operation therewith as said pan is moved along said path.

6. In a machine as recited in claim 5 in which said head, said liner forming die, said first lid forming die, said second lid forming die and said dough crimper are of porous material.

7. In a machine as recited in claim 6 in which said porous material is porous metal.

8. In a machine as recited in claim 7 in which said porous metal is sintered stainless steel.

9. In a machine as recited in claim 5 in which said head, said liner forming die, said first lid forming die, said second lid forming die and said dough crimper are of porous material and means for discharging air through said porous material.

10. A machine for lining and filling pie pans comprising a first conveyor for receiving and moving a pie pan along a first predetermined path, a second conveyor for receiving a pie pan from said first conveyor and for moving said pan along a second predetermined path, pan dispensing means on said first conveyor, means on said pan dispensing means for receiving and supporting a plurality of nested pans in a substantially vertical column above said conveying means, means for separating and releasing individual pie pans from the bottom of said vertical column and for discharging said individual pans onto said first conveyor, a dough dispenser on said first conveyor, a reservoir on said dough dispenser, a dough metering chamber on said dough dispenser, means for feeding dough from said reservoir to said dough metering chamber, a plunger on said dough dispenser, a head fixed to one end of said plunger, means for reciprocating said plunger through said dough metering chamber and for engaging said head with the dough in said metering chamber as said plunger is reciprocated through said dough metering chamber to remove said dough from said chamber and to deposit said dough in a pan moved by said first conveyor along said first predetermined path, a cup former on said first conveyor, a liner forming die on said cup former, means for moving said liner former die into and out of engagement with a pie moved by said conveyor along said first predetermined path to form said dough into a liner in said pan, means for transferring said pan with said liner formed therein from said first conveyor to said second conveyor, a gravy dispenser on said second conveyor, a reservoir on said gravy dispenser, metering means on said gravy dispenser for metering and delivering metered quantities of gravy from said reservoir to a lined pie pan as said lined pie pan is moved by said second conveyor along said second predetermined path, a meat dispenser on said second conveyor, means on said meat dispenser for receiving and supporting a column of meat in a substantially vertical column above said conveyor, means for measuring and severing portions of meat from said column and for discharging said measured and severed portions into said lined pan as said lined pan is moved by said second conveyor along said second predetermined path, a lid former on said second conveyor, a reservoir on said lid former, a dough metering chamber on said lid former, means for feeding dough from lid former reservoir to said dough metering chamber on said lid former, a first lid forming die on said lid former, means for removing dough from said dough metering chamber on said lid former and for depositing said dough on said first lid forming die, a second lid forming die on said lid former, means for moving said second die into mating engagement with said first die to form said dough on said first die into a lid, means for moving said first die and said lid into mating engagement with a lined pan moving along said second predetermined path, means for removing said formed lid from said first die and for depositing said lid on said lined pie as said lid and said lined pie are in substantial mating engagement, a dough crimper, and means for moving said dough crimper into and out of engagement with the lid on a lined pie as said pan is moved along said second predetermined path.

11. In a machine as recited in claim 10 including driving means, a first means interconnecting said driving means and said first conveyor, a second means interconnecting said driving means with said second conveyor, said driving means driving said first and said second conveying means in timed sequence through said first and second interconnecting means.

12. In a machine as recited in claim 11 in which said head, said liner forming die, said first lid forming die, said second lid forming die and said dough crimper are of porous material.

13. In a machine as recited in claim 12 in which said porous material is porous metal.

14. In a machine as recited in claim 13 in which said porous metal is porous, pressure formed, sintered stainless steel.

15. In a machine as recited in claim 11 in which said head, said liner forming die, said first lid forming die, said second lid forming die and said dough crimper are of porous material and means for discharging air through said porous material.

16. A dough forming machine comprising dough metering means, dough receiving means, means for removing a metered quantity of dough from said dough metering means and for depositing said dough in said dough receiving means, means for releasing said dough from said dough removing means after said dough is deposited in said dough receiving means, means for engaging said dough on said dough receiving means and for pressing said dough into engagement with said dough receiving means to form said dough on said dough receiving means and means for selectively releasing said dough from said dough receiving means and said dough engaging means, respectively, after said dough is formed on said dough receiving means.

17. A dough forming machine as recited in claim 16 in which said last mentioned dough releasing means includes a porous head on said dough removing means and means for discharging air through said porous head to release said dough therefrom.

18. A dough forming machine as recited in claim 17 in which said porous head is of porous, pressure sintered, powdered stainless steel.

19. A dough forming machine comprising dough metering means, dough receiving means, means for removing a metered quantity of dough from said dough metering means and for depositing said dough in said dough receiving means, a porous metal member, means for moving said porous metal member into engagement with said dough in said dough receiving means for pressing said dough into engagement with said dough receiving means to form said dough on said dough receiving means, said porous metal member being porous through a major portion of its dough engaging surface, and means for feeding air under pressure through the pores of said porous metal member for releasing said dough from said porous member after said dough is formed on said dough receiving means whereby, when said porous metal member is moved relative to said dough receiving means as said air under pressure passes through the pores of said porous metal member, said dough is released from said porous metal member.

20. A dough forming machine as recited in claim 19 in which said porous member is of porous, pressure sintered, powdered metal.

21. A dough forming machine as recited in claim 20 in which said powdered metal is stainless steel.

22. A dough forming machine comprising dough metering means, a first porous member for receiving dough, means for removing a metered quantity of dough from said dough metering means and for depositing said dough on said first porous member, means for releasing said dough from said dough removing means after said dough is deposited on said first porous member, a second porous member, means for moving said second porous member into engagement with said dough on said first porous member for pressing said dough between said porous members and means for selectively feeding air under pressure through the pores of said first porous member and said second porous member for selectively releasing said dough from said porous members.

23. A dough forming machine as recited in claim 22 in which said porous members are of porous, pressure sintered, powdered metal.

24. A dough forming machine as recited in claim 23 in which said powdered metal is stainless steel.

References Cited in the file of this patent

UNITED STATES PATENTS

| 778,295 | Williams | Dec. 27, 1904 |
| 782,615 | Manning | Feb. 14, 1905 |
| 1,592,536 | O'Neill | July 13, 1926 |
| 2,280,324 | Tracy | Apr. 21, 1942 |
| 2,989,932 | Egee et al. | June 27, 1961 |

FOREIGN PATENTS

| 385,035 | Great Britain | Dec. 22, 1932 |
| 868,813 | Great Britain | May 25, 1961 |